(12) United States Patent
Imamura

(10) Patent No.: US 9,289,932 B2
(45) Date of Patent: Mar. 22, 2016

(54) HEATING CYLINDER PROTECTION COVER FOR AN INJECTION MOLDING MACHINE

(71) Applicant: FANUC Corporation, Yamanashi (JP)

(72) Inventor: Hiroshi Imamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/562,049

(22) Filed: Dec. 5, 2014

(65) Prior Publication Data

US 2015/0158226 A1    Jun. 11, 2015

(30) Foreign Application Priority Data

Dec. 5, 2013  (JP) ................................. 2013-252530

(51) Int. Cl.
  *B29C 45/74*  (2006.01)
  *B29C 45/84*  (2006.01)

(52) U.S. Cl.
  CPC ................ *B29C 45/74* (2013.01); *B29C 45/84* (2013.01)

(58) Field of Classification Search
  CPC ...................................................... B29C 45/74
  USPC ................... 425/547, 548, 549, 550
  See application file for complete search history.

(56) References Cited

U.S. PATENT DOCUMENTS 3,939,995 A * 2/1976 Baxter .......................... 410/119

FOREIGN PATENT DOCUMENTS

| JP | 7-88894 A | 4/1995 |
| JP | 2000-263592 A | 9/2000 |
| JP | 2006-123374 A | 5/2006 |
| JP | 2012-006276 A | 1/2012 |

OTHER PUBLICATIONS

Office Action mailed Feb. 3, 2015, corresponding to Japanese patent application No. 2013-252530.

* cited by examiner

*Primary Examiner* — Tim Heitbrink
(74) *Attorney, Agent, or Firm* — Hauptman Ham, LLP

(57) ABSTRACT

A heating cylinder protection cover that covers an entire circumference of a heating cylinder of an injection molding machine is configured from a plurality of protection cover members. Cutouts for cable passing section formation are provided in one or both of a pair of cover members joined to each other among the plurality of protection cover members. A cable is drawn out to the outer side of the heating cylinder protection cover through the cutouts for cable passing section formation.

6 Claims, 20 Drawing Sheets

US 9,289,932 B2

HEATING CYLINDER PROTECTION COVER FOR AN INJECTION MOLDING MACHINE

RELATED APPLICATIONS

The present application claims priority to Japanese Application Number 2013-252530, filed Dec. 5, 2013, the disclosure of which is hereby incorporated by reference herein in its entirety.

BACKGROUND OF THE INVENTION

1. Field of the Invention

The present invention relates to an injection molding machine and, more particularly, to a heating cylinder protection cover of the injection molding machine.

2. Description of the Related Art

An electric heater is set in a heating cylinder of an injection molding machine, and supplies a heat quantity necessary for melting resin. The supply of the heat quantity is performed by heat conduction due to direct contact of the electric heater and the heating cylinder, whereby the heating cylinder is warmed. Therefore, a heating cylinder protection cover that prevents the body of an operator from coming into direct contact with the electric heater and the heating cylinder having high temperature is attached to the injection molding machine.

Japanese Patent Application Laid-Open No. 2012-6276 discloses that the outer side of a heating cylinder is surrounded by a double cover of a heat retaining cover and a heat insulating cover on the outer side of the heat retaining cover. One end of a heat retaining cover attaching section is joined to a heat retaining cover inclined section that joins the heat retaining cover to the heating cylinder. A heat insulating cover attaching section is formed in a heating insulating cover vertical surface section that joins the heat insulating cover to the heat retaining cover. The heat insulating cover attaching section is arranged in a position lower than the heat retaining cover attaching section.

A power supply cable of a heating cylinder electric heater is sometimes set on the inner side of a heating cylinder protection cover that covers the entire circumference of the heating cylinder. The inner side of the heating cylinder protection cover, which covers the entire circumference of the heating cylinder, has high temperature because heat accumulates on the inner side. This is undesirable as an environment of use of the power supply cable of the heating cylinder electric heater. However, when the heating cylinder protection cover is cut wide in order to draw out the power supply cable of the electric heater to the outer side of the heating cylinder, the heating cylinder is dangerously exposed from the cut part.

In general, a plurality of the electric heaters for the heating cylinder are used in the heating cylinder. The power supply cables of the respective electric heaters are bundled into one cable by a tying band or the like. Therefore, it is difficult in terms of structure to draw out only the power supply cables of the electric heaters for the heating cylinder to the outer side of the heating cylinder protection cover without untying the power supply cables.

The cover disclosed in Japanese Patent Application Laid-Open No. 2012-6276 has structure in which the heat of the heating cylinder is not easily transferred to the heat insulating cover. The cover does not particularly improve the environment of use of the power supply cable of the heating cylinder electric heater.

SUMMARY OF THE INVENTION

Therefore, in order to solve the problems of the related art, it is an object of the present invention to provide a heating cylinder protection cover of an injection molding machine capable of improving an environment of use of a cable by drawing out the cable to the outer side of the heating cylinder protection cover.

A heating cylinder protection cover that covers the entire circumference of a heating cylinder includes a hole for drawing out a power supply cable, a thermocouple cable, and the like of a heating cylinder or an electric heater to the outer side of the heating cylinder protection cover. The heating cylinder protection cover that covers the entire circumference of the heating cylinder is configured from a plurality of protection cover members. In at least one protection cover member among the plurality of protection cover members, a cutout for forming the hole for drawing out the cables to the outer side of the heating cylinder protection cover is provided.

In the heating cylinder protection cover according to the present invention, it is possible to improve an environment of use of the cables by drawing out the cables to the outer side of the heating cylinder protection cover that covers the entire circumference of the heating cylinder and accumulates heat to have high temperature. In the heating cylinder protection cover according to the present invention, it is possible to draw out only the cables to the outer side of the heating cylinder protection cover that covers the entire circumference of the heating cylinder. It is possible to minimize an exposed portion of the heating cylinder.

A heating cylinder protection cover according to the present invention is a cover that covers the entire circumference of a heating cylinder of an injection molding machine. The heating cylinder protection cover includes a cable passing section for drawing out a cable to the outer side of the heating cylinder protection cover.

The heating cylinder protection cover is configured from a plurality of dividable protection cover members. Cutouts for cable passing section formation may be provided in one or both of the protection cover members joined to each other in some or all of the protection cover members jointed to one another, The entire circumference of the heating cylinder may be covered by assembling all the protection cover members configuring the heating cylinder protection cover to the heating cylinder. The cable passing section for drawing out the cable to the outer side of the heating cylinder protection cover may be formed by the cutouts for cable passing section formation provided in the protection cover members.

A dividing line, which serves as a boundary between the protection cover members joined to each other among the plurality of protection cover members configuring the heating cylinder protection cover, may extend from the front end to the rear end of the heating cylinder protection cover in the axial direction of the heating cylinder or the dividing line may be closed.

First and second protection cover members among the plurality of protection cover members configuring the heating cylinder protection cover may be joined to each other by a captive bolt.

The first protection cover member may include a first surface section having a first hole. The second protection cover member may include a second surface section parallel to the first surface section of the first protection cover member and having a second hole formed in a position corresponding to the first hole of the first surface section, and a third surface section parallel to the second surface section and including a first bolt fixing section provided coaxially with the hole of the second surface section. The first protection cover and the second protection cover may be jointed to each other by a captive bolt inserted through the first hole and the second hole and fastened into the first bolt fixing section.

A fold may be provided in the cable passing section.

According to the present invention, it is possible to provide the heating cylinder protection cover of the injection molding machine capable of improving an environment of use of the cable by drawing out the cable to the outer side of the heating cylinder protection cover.

BRIEF DESCRIPTION OF THE DRAWINGS

The object and the features explained above and other objects and features of the present invention will be made apparent from embodiments explained below with reference to the accompanying drawings. In the figures.

DESCRIPTION OF THE PREFERRED EMBODIMENTS

First, a heating cylinder protection cover according to a first embodiment of the present invention is explained with reference to FIGS. 1 to 4.

Figure 1:
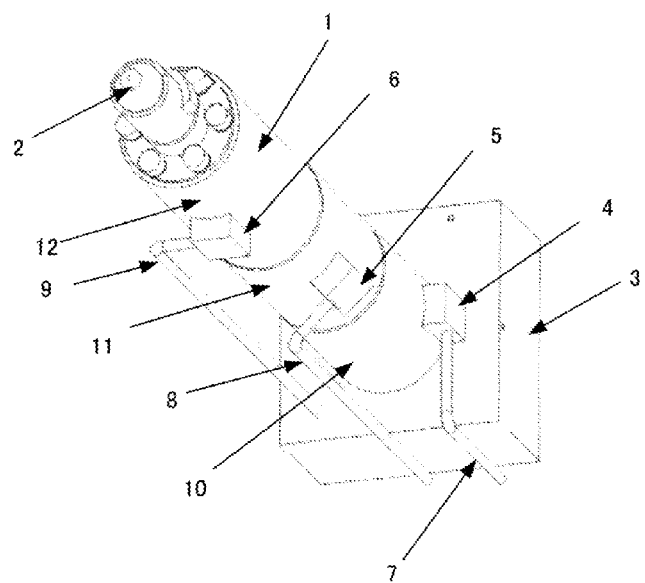
FIG. 1 is a diagram showing the structure of a heating cylinder of an injection molding machine to which a heating cylinder protection cover according to a first embodiment of the present invention is attached.

FIG. 1 is a diagram showing the structure of a heating cylinder 1 of an injection molding machine to which the heating cylinder protection cover according to the first embodiment of the present invention is attached.

In the heating cylinder 1, as shown in FIG. 1, three heating cylinder electric heaters 10, 11, and 12 are used. Three terminal boxes 4, 5, and 6 are arranged on the side surface of the heating cylinder 1 to correspond to the heating cylinder electric heaters 10, 11, and 12. Phases of the terminal boxes 4, 5, and 6 in the heating cylinder circumferential direction are different from one another. A water cooling jacket 3 is arranged to surround a low-temperature section of a screw (not shown in the figure) in a base section of the heating cylinder 1 and is fixed to a main body of the injection molding machine. Water for cooling the screw is supplied to the water cooling jacket 3.

Figure 2:
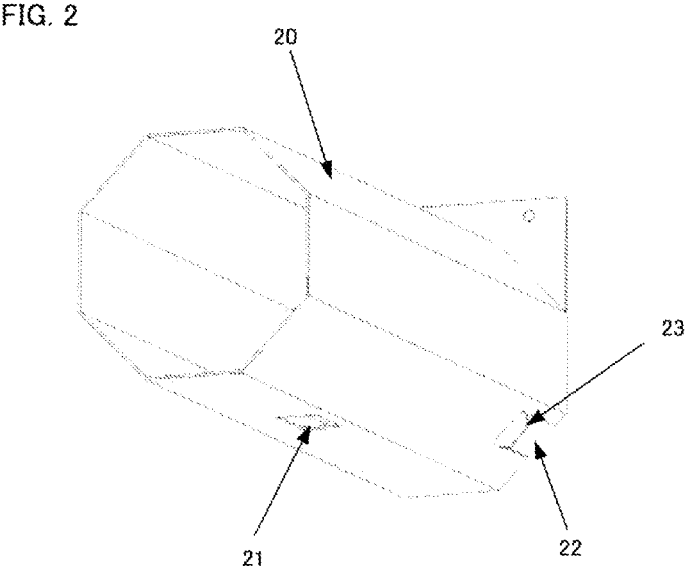
FIG. 2 is a diagram showing the shape of the heating cylinder protection cover according to the first embodiment of the present invention.

FIG. 2 is a diagram showing a shape example of a heating cylinder protection cover 20 in this embodiment.

The heating cylinder protection cover 20 in this embodiment is a hollow polygonal pillar octagonal in cross section obtained by a plane perpendicular to the axis of the heating cylinder 1. A hole 21 and a cutout 22 for power supply cable passage of the heating cylinder electric heaters 10, 11, and 12 are formed in the heating cylinder protection cover 20. The hole 21 for cable passage and the cutout 22 for cable passage are desirably respectively arranged such that the power supply cables 7, 8, and 9 of the heating cylinder electric heaters 10, 11, and 12 are present in the vicinity of portions connected to the heating cylinder electric heaters 10, 11, and 12 when the heating cylinder protection cover 20 is attached to the heating cylinder 1. However, the hole 21 for cable passage and the cutout 22 for cable passage do not have to be associated with the power supply cables 7, 8, and 9 of the heating cylinder electric heaters 10, 11, and 12 in a one-on-one relationship. Note that the cables shown in the figure are cables for power supply.

In the cutout 22 for cable passage, a fold 23 is provided to prevent the end of the cutout 22 for cable passage from rubbing against a power supply cable 7 of the heating cylinder electric heater 10 to damage the power supply cable 7. The fold 23 is desirably present in all directions of the cutout 22 for cable passage. However, the fold 23 only has to be present at least in a direction in which the power supply cable 7 of the heating cylinder electric heater 10 is drawn out.

Figure 3:
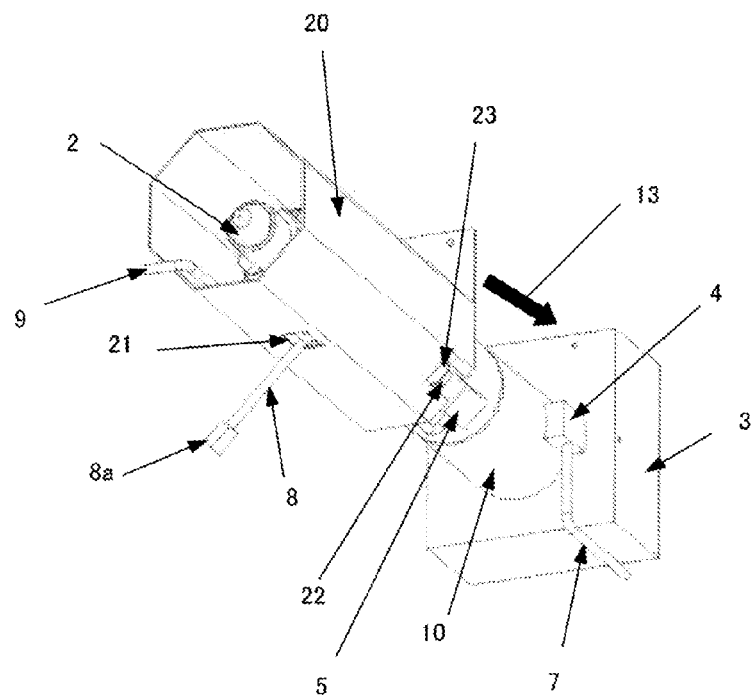
FIG. 3 is a diagram showing a state just before the heating cylinder protection cover shown in FIG. 2 is attached to the heating cylinder of the injection molding machine shown in FIG. 1.

FIG. 3 is a diagram showing a state just before the heating cylinder protection cover 20 shown in FIG. 2 is attached to the heating cylinder 1 of the injection molding machine shown in FIG. 1.

A method of attaching the heating cylinder protection cover 20 shown in FIG. 2 to the heating cylinder 1 shown in FIG. 1 is explained. First, a terminal end section (a connector section 8a) of a power supply cable 8 of the heating cylinder electric heater 11 is inserted through a hole 21 for cable passage of the heating cylinder protection cover 20. Subsequently, the heating cylinder protection cover 20 is inserted over the heating cylinder 1 from a nozzle 2 side and fixed to the water cooling jacket 3 of the heating cylinder 1. The cable 7 of the heating cylinder electric heater 10 is inserted through a hole formed by the cutout 22 for cable passage and the water cooling jacket 3. Thereafter, a terminal end section of a power supply cable 9 of the heating cylinder electric heater 12 is pulled. The cable 9 is drawn out to the outer side of the heating cylinder protection cover 20 from the nozzle 2 side.

Figure 4:
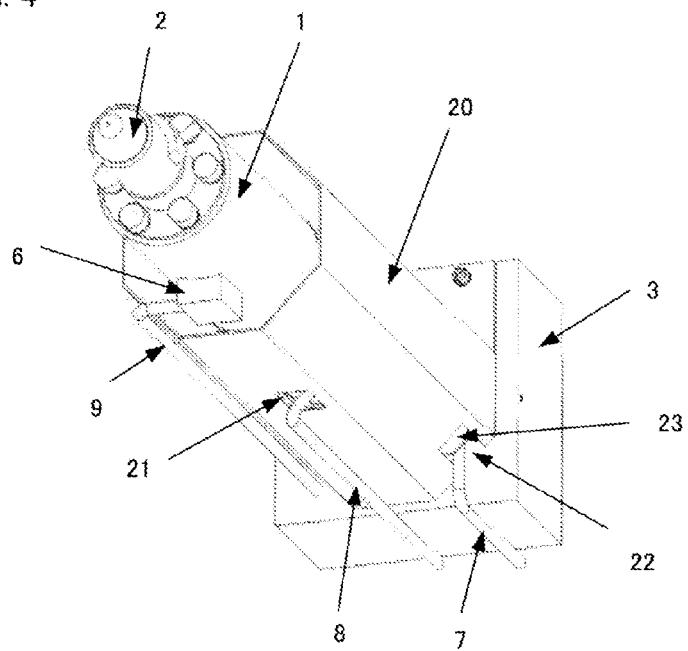
FIG. 4 is a diagram showing a state in which the heating cylinder protection cover shown in FIG. 2 is attached to the heating cylinder of the injection molding machine shown in FIG. 1.

Consequently, as shown in FIG. 4, the heating cylinder protection cover 20 shown in FIG. 2 can be attached to the heating cylinder 1 shown in FIG. 1. In this embodiment, a hole for cable passage and a cutout for cable passage for drawing out a cable, which is connected to a thermocouple attached to a side section of the heating cylinder 1 in order to measure the temperature in the heating cylinder 1, to the outer side of the heating cylinder protection cover 20 may be prepared. This can be adopted not only in this embodiment but also in other embodiments.

In the heating cylinder protection cover 20 shown in FIG. 2, a cross-sectional shape obtained by a plane perpendicular to the axis of the heating cylinder 1 is an octagonal shape. However, the cross-sectional shape of the heating cylinder protection cover 20 is not limited to the octagonal shape and can take various shapes such as other polygonal shapes, a circular shape, and a semicircular shape.

A heating cylinder protection cover according to a second embodiment of the present invention is explained with reference to FIGS. 5 to 7.

A heating cylinder protection cover 30 in this embodiment is configured from a first protection cover member 31, a second protection cover member 32, a third protection cover member 33, a fourth protection cover member 34, a fifth protection cover member 35, and a sixth protection cover member 36.

Figure 5:
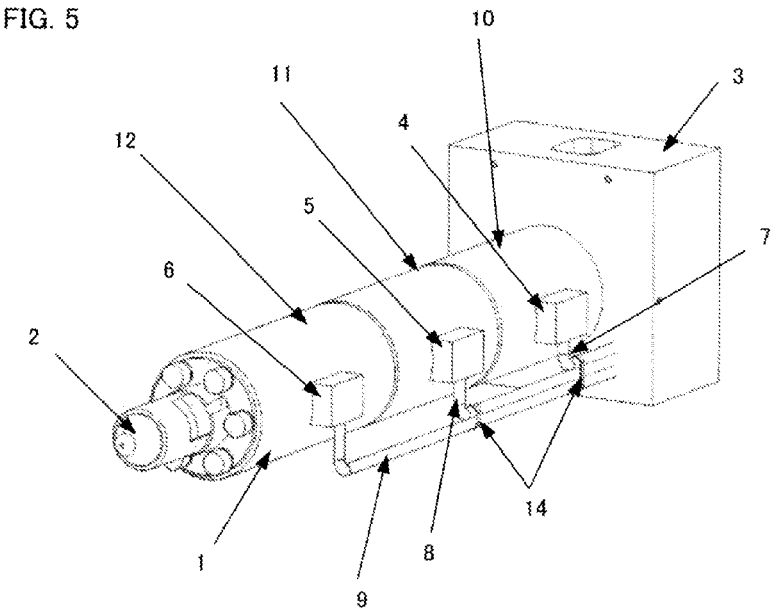
FIG. 5 is diagram showing the structure of a heating cylinder of an injection molding machine attached to heating cylinder protection covers according to second, third, fourth, sixth, and eighth embodiments of the present invention.
Figure 6:
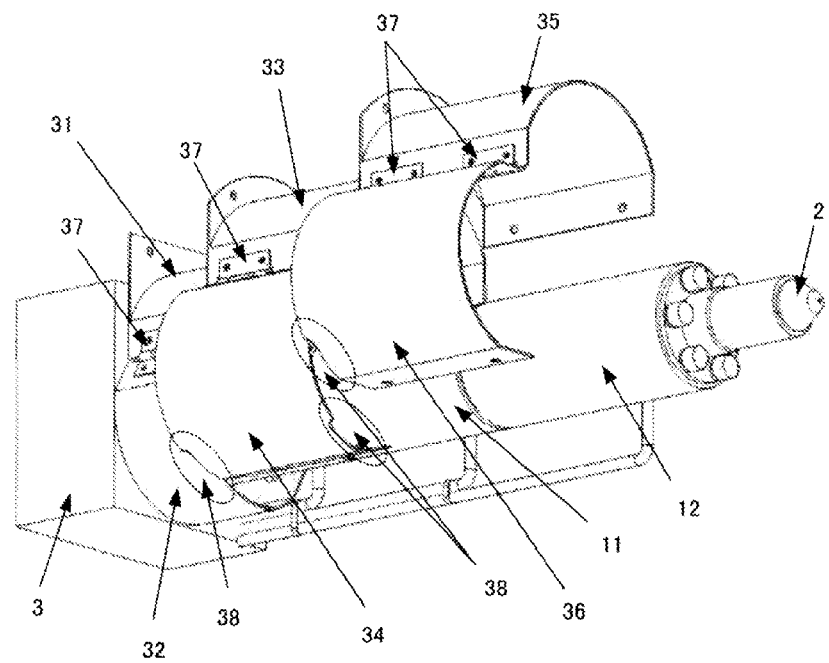
FIG. 6 is a diagram showing a state just before the heating cylinder protection cover according to the second embodiment of the present invention is attached to the heating cylinder of the injection molding machine shown in FIG. 5.

FIG. 5 is a diagram showing the heating cylinder 1 of the injection molding machine before the heating cylinder protection cover shown in FIG. 6 is attached.

The power supply cables 7, 8, and 9 of the heating cylinder electric heaters 10, 11, and 12 are drawn out downward to the outside (in a direction perpendicular to the axial direction of the heating cylinder 1) from three terminal boxes 4, 5, and 6 arranged at substantially equal intervals on the side surface of the heating cylinder 1 along the axial direction of the heating cylinder 1. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by tying bands 14 respectively in a place where two cables merge and a place where three cables merge.

FIG. 6 is a diagram showing a state just before the heating cylinder protection cover 30 in this embodiment is attached to the heating cylinder 1 of the injection molding machine shown in FIG. 5.

The first protection cover member 31, the third protection cover member 33, and the fifth protection cover member 35 of the heating cylinder protection cover 30 are formed in an arch shape that covers the heating cylinder 1 in a portion above a horizontal plane that passes the center axis of the heating cylinder 1. On the other hand, the second protection cover member 32, the fourth protection cover member 34, and the sixth protection cover member 36 of the heating cylinder protection cover 30 are formed in an arch shape that covers the heating cylinder 1 in a portion below the horizontal plane that passes the center axis of the heating cylinder 1. Cutouts for cable passing section formation (cutouts 38 for cable passing section formation) are formed in the cover members. The cutouts are formed to form cable passing sections for drawing out the power supply cables 7 and 8 of the heating cylinder electric heaters 10 and 11 to the outer side of the heating cylinder protection cover 30. The first protection cover member 31 and the second protection cover member 32, the third protection cover member 33 and the fourth protection cover member 34, and the fifth protection cover member 35 and the sixth protection cover member 36 are respectively connected to each other by hinges 37.

Fixing of the protection cover members 31, 32, 33, 34, 35, and 36 to the heating cylinder 1 is explained.

First, the first protection cover member 31 is fixed to the water cooling jacket 3 of the heating cylinder 1 in a state in which the second protection cover member 32 is opened. The second protection cover member 32 is closed and fixed to the first protection cover member 31. Subsequently, the third protection cover member 33 is fixed to the first protection cover member 31 in a state in which the fourth protection cover member 34 is opened. The fourth protection cover member 34 is closed and fixed to the third protection cover member 33. Subsequently, the fifth protection cover member 35 is fixed to the third protection cover member 33 in a state in which the sixth protection cover member 36 is opened. The sixth protection cover member 36 is closed and fixed to the fifth protection cover member 35.

Consequently, the heating cylinder protection cover 30 can be fixed to the heating cylinder 1. In this case, as shown in FIG. 6, the cutouts 38 for cable passing section formation are respectively formed in the second protection cover member 32, the fourth protection cover member 34, and the sixth protection cover member 36. Therefore, cable passing sections 39 are formed in a boundary between the second protection cover member 32 and the fourth protection cover member 34 and a boundary between the fourth protection cover member 34 and the sixth protection cover member 36. It is possible to draw out the power supply cables 7, 8, and 9 of the heating cylinder electric heaters 10, 11, and 12 to the outer side of the heating cylinder protection cover 30 from the cable passing sections 39 without untying the power supply cables 7, 8, and 9 of the heating cylinder electric heaters 10, 11, and 12 bundled into one cable by the tying bands 14. Note that the folds 23 shown in FIG. 2 (the first embodiment) may be respectively provided in the cutouts 38 for cable passing section formation (FIG. 6) formed in the second protection cover member 32, the fourth protection cover member 34, and the sixth protection cover member 36.

A heating cylinder protection cover according to a third embodiment of the present invention is explained with reference to FIG. 5 and FIGS. 8 to 10.

A heating cylinder protection cover 50 in this embodiment is configured from a first protection cover member 51 and a second protection cover member 52. The structure of the heating cylinder 1 to which the heating cylinder protection cover 50 is attached is as shown in FIG. 5. That is, the three heating cylinder electric heaters 10, 11, and 12 are used in the heating cylinder 1. The three terminal boxes 4, 5, and 6 are arranged on the side surface of the heating cylinder 1 in association with the heating cylinder electric heaters 10, 11, and 12. The power supply cables 7, 8, and 9 of the heating cylinder electric heaters 10, 11, and 12 are drawn out downward to the outside (in the direction perpendicular to the axial direction of the heating cylinder 1) from the terminal boxes 4, 5, and 6. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 8:
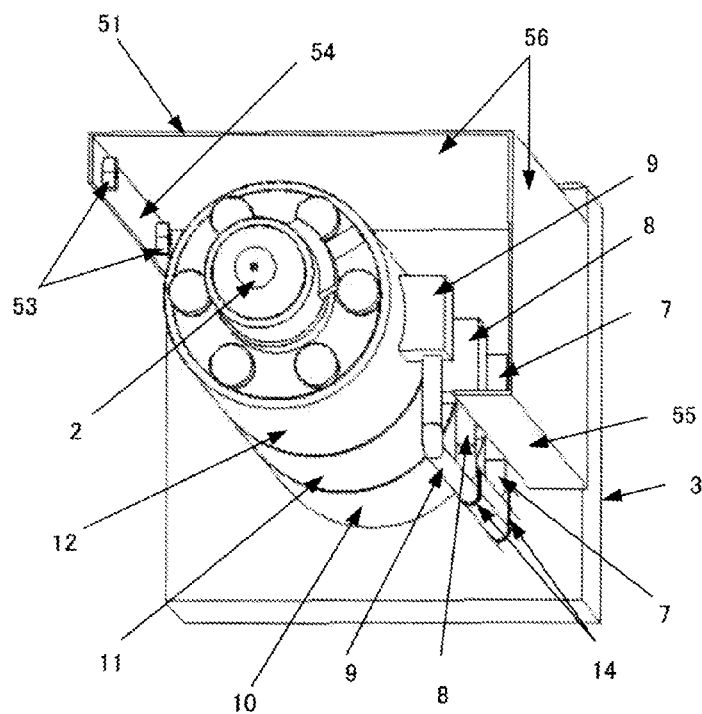
FIG. 8 is a diagram showing a state in which a first protection cover member configuring the heating cylinder protection cover according to the third embodiment of the present invention is fixed to a water cooling jacket of the injection molding machine shown in FIG. 5.

FIG. 8 is a diagram showing a state in which the first protection cover member 51 configuring the heating cylinder protection cover 50 is fixed to the water cooling jacket 3 of the heating cylinder 1 of the injection molding machine.

The first protection cover member 51 is configured from a first surface section 54 having first weld nuts 53, a second surface section 55 perpendicular to the first surface section 54, and connecting sections that connect the first surface section 54 and the second surface section 55. The connecting sections are configured from a first plane section 56 perpendicular to the first surface section 54 and a second plane section 56 perpendicular to the first plane section 56 and perpendicular to the second surface section 55. The first weld nut 53 shown in FIG. 8 is welded coaxially with a hole opened in the first surface section 54.

Figure 9:
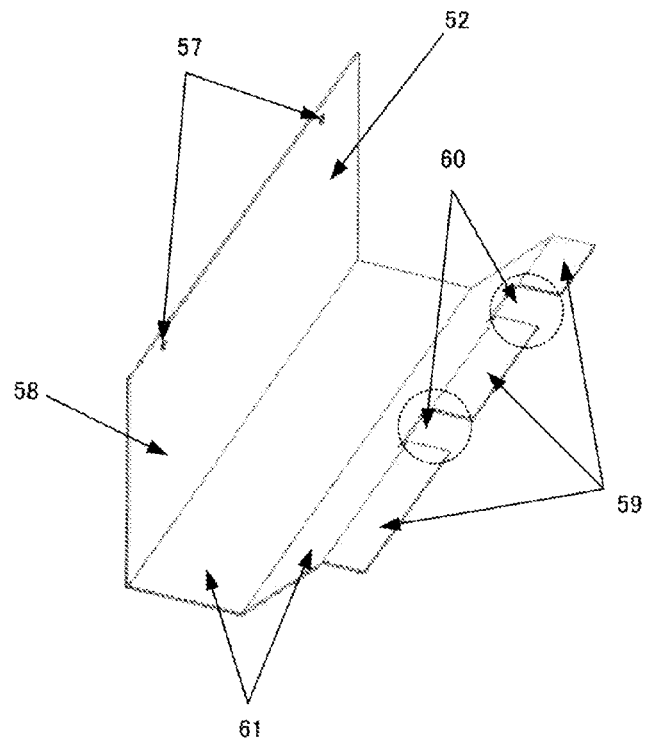
FIG. 9 is a diagram showing a shape example of a second protection cover member configuring the heating cylinder protection cover shown in FIG. 8.

FIG. 9 is a diagram showing a shape example of the second protection cover member 52 configuring the heating cylinder protection cover 50.

The second protection cover member 52 includes a third surface section 58, a fourth surface section 59, and connecting sections that connect the third surface section 58 and the fourth surface section 59. The third surface section 58 has first holes 57 in positions corresponding to the first weld nuts 53 welded to the first surface section 54 of the first protection cover member 51. The fourth surface section 59 is perpendicular to the third surface section 58. When being attached to the first protection cover member 51, the fourth surface section 59 is located above the second surface section 55 of the first protection cover member 51. The connecting sections that connect the third surface section 58 and the fourth surface section 59 are configured from two plane sections (first and second plane sections 61) bent at an angle of 135 degrees.

In the fourth surface section 59 of the second protection cover member 52, cutouts (cutouts for cable passing section formation) 60 are formed. The cutouts are formed to form cable passing sections for drawing out the power supply cables 7 and 8 of the heating cylinder electric heaters 10 and 11 to the outer side of the heating cylinder protection cover 50 when the second protection cover member 52 is attached to the first protection cover member 51.

Figure 10:
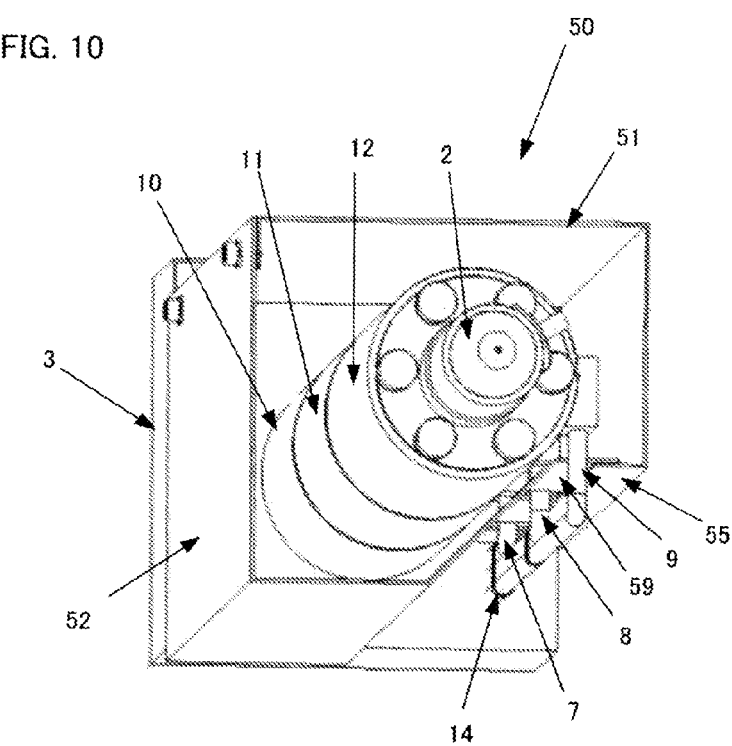
FIG. 10 is a diagram showing a state in which the second protection cover member shown in FIG. 9 is attached to the first protection cover member shown in FIG. 8.

The second protection cover member 52 can be attached to the first protection cover member 51 by inserting bolts through the first holes 57 of the second protection cover member 52, with the fourth surface section 59 of the second protection cover member 52 located above the second surface section 55 of the first protection cover member 51, and fastening the screw sections of the bolts by the first weld nuts 53 (FIG. 8) welded to the first surface section 54 of the first protection cover member 51. In this case, as shown in FIG. 10, a part of the second surface section 55 of the first protection cover member 51 and a part of the fourth surface section 59 of the second protection cover member 52 overlap each other. Consequently, a cable passing section is formed. It is possible to draw out the power supply cables 7, 8, and 9 of the heating cylinder electric heaters 10, 11, and 12 to the outer side of the heating cylinder protection cover 50 from the cable passing section without untying the power supply cables 7, 8, and 9 of the heating cylinder electric heaters 10, 11, and 12 bundled into one cable by the tying bands 14.

In this embodiment, when the thickness of a material of the heating cylinder protection cover 50 is sufficiently large with respect to a screw pitch of the bolts, internal threads may be directly machined in the heating cylinder protection cover 50 instead of using the first weld nuts 53. The connecting sections (the first and second plane sections 56) that connect the first surface section 54 and the second surface section 55 of the first protection cover member 51 and the connecting sections (the first and second plane sections 61) that connect the third surface section 58 and the fourth surface section 59 of the second protection cover member 52 may be formed using one plane or curved surface or a plurality of bent planes. Note that the fold 23 shown in FIG. 2 (the first embodiment) may be provided in the cutouts 60 for cable passing section formation (FIG. 9) formed in the fourth surface section 59 of the second protection cover member 52.

A heating cylinder protection cover according to a fourth embodiment of the present invention is explained with reference to FIG. 5 and FIGS. 11 and 12.

A heating cylinder protection cover 70 in this embodiment is configured from a first protection cover member 71 and a second protection cover member 72. The structure of the heating cylinder 1 to which the heating cylinder protection cover 70 is attached is as shown in FIG. 5. That is, in the heating cylinder 1, the three heating cylinder electric heaters 10, 11, and 12 are used. The three terminal boxes 4, 5, and 6 are arranged on the side surface of the heating cylinder 1 in association with the heating cylinder electric heaters 10, 11, and 12.

The power supply cables 7, 8, and 9 of the heating cylinder electric heaters 10, 11, and 12 are drawn out downward to the outside (in the direction perpendicular to the axial direction of the heating cylinder 1) from the three terminal boxes 4, 5, and 6 arranged at substantially equal intervals on the side surface of the heating cylinder 1 along the axial direction of the heating cylinder 1. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 11:
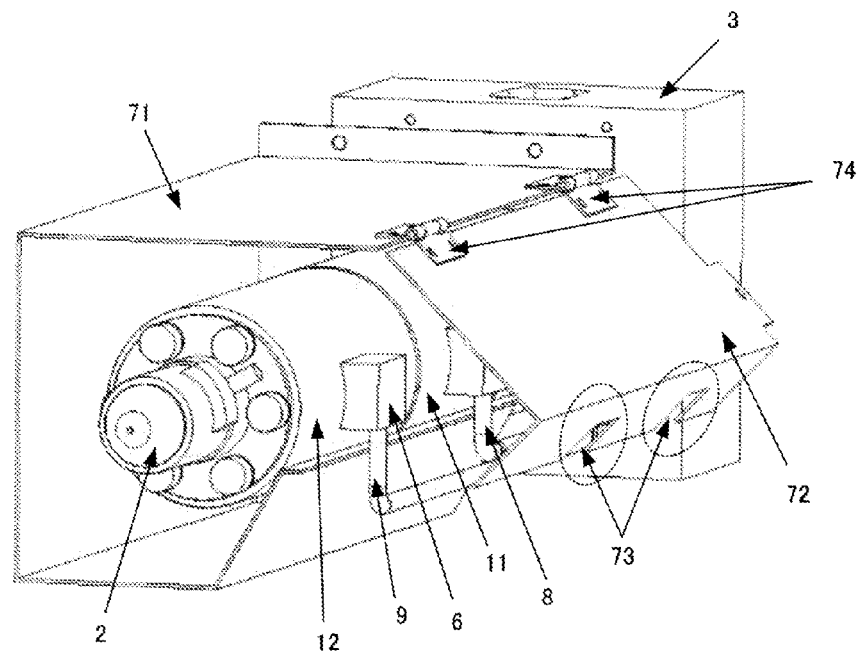
FIG. 11 is a diagram showing a state just before the heating cylinder protection cover according to the fourth embodiment of the present invention is attached to the heating cylinder of the injection molding machine shown in FIG. 5.
Figure 12:
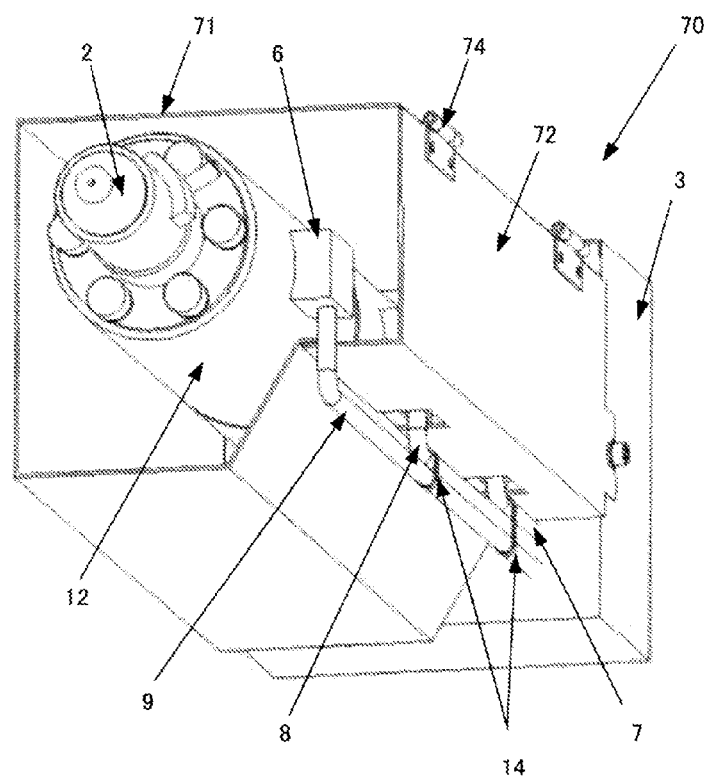
FIG. 12 is a diagram showing a state in which the heating cylinder protection cover shown in FIG. 11 is attached to the heating cylinder of the injection molding machine shown in FIG. 5.

FIG. 11 is a diagram showing a state just before the heating cylinder protection cover 70 in this embodiment is attached to the heating cylinder 1 of the injection molding machine.

The heating cylinder protection cover 70 is configured from the first protection cover member 71 and the second protection cover member 72 connected to the first protection cover member 71 with hinges 74. The first protection cover member 71 has five surface sections. The first protection cover member 71 covers, with the five surface section, the entire circumference excluding the vicinities of the terminal boxes 4, 5, and 6 to which the power supply cables 7, 8, and 9 of the heating cylinder electric heaters 10, 11, and 12 are connected.

The second protection cover member 72 is connected to the first protection cover member 71 by the hinges 74 such that the second protection cover member 72 can cover the vicinities of the terminal boxes 4, 5, and 6 to which the power supply cables 7, 8, and 9 of the heating cylinder electric heaters 10, 11, and 12 are connected. In the second protection cover member 72, cutouts (cutouts for cable passing section formation) 73 are formed. The cutouts 73 are formed to form cable passing sections for drawing out the power supply cables 7 and 8 of the heating cylinder electric heaters 10 and 11 to the outer side of the heating cylinder protection cover 70 when the second protection cover member 72 is fixed to the water cooling jacket 3 of the heating cylinder 1.

A method of attaching the heating cylinder protection cover 70 to the heating cylinder 1 is explained. As shown in FIG. 11, in a state in which the heating cylinder protection cover 70 is moved in the axial direction of the heating cylinder 1 from the nozzle distal end side of the heating cylinder 1 to cover the heating cylinder 1 in a state in which the second protection cover member 72 of the heating cylinder protection cover 70 is opened (FIG. 11), the first protection cover member 71 of the heating cylinder protection cover 70 is fixed to the water cooling jacket 3 of the heating cylinder 1 by bolts. Subsequently, the second protection cover member 72 is turned (FIG. 12). The second protection cover member 72 is fixed to the side surface of the water cooling jacket 3 by bolts.

Consequently, the heating cylinder protection cover 70 can be attached to the heating cylinder 1. In this case, as shown in FIG. 12, a part of the first protection cover member 71 and a part of the second protection cover member 72 overlap each other. Consequently, a cable passing section is formed. It is possible to draw out the power supply cables 7, 8, and 9 of the heating cylinder electric heaters 10, 11, and 12 to the outer side of the heating cylinder protection cover 70 from the cable passing section without untying the power supply cables 7, 8, and 9 of the heating cylinder electric heaters 10, 11, and 12 bundled into one cable by the tying bands 14. Note that the fold 23 shown in FIG. 2 (the first embodiment) may be provided in the cutouts 73 for cable passing section formation (FIG. 11) formed in the second protection cover member 72.

A heating cylinder protection cover according to a fifth embodiment of the present invention is explained with reference to FIGS. 13 to 16.

A heating cylinder protection cover 80 in this embodiment is configured from a first protection cover member 81 and a second protection cover member 82.

Figure 13:
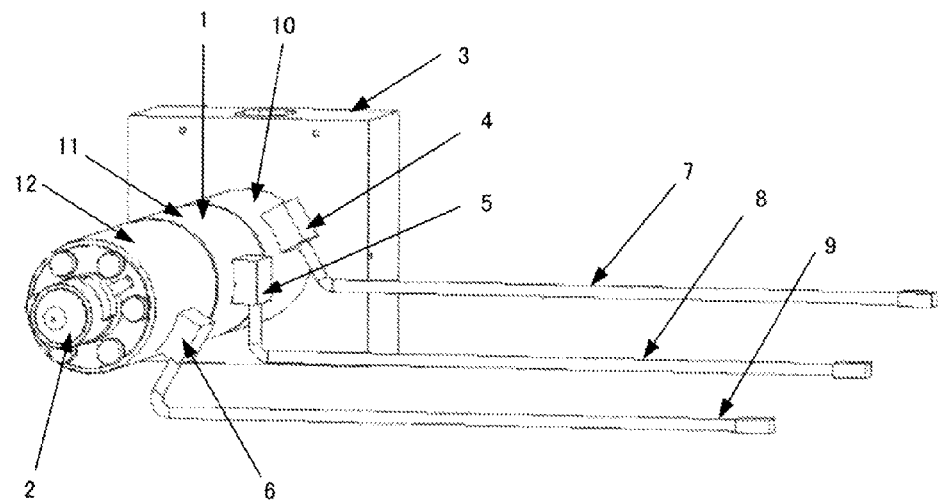
FIG. 13 is a diagram showing the structure of a heating cylinder of an injection molding machine to which a heating cylinder protection cover according to a fifth embodiment of the present invention is attached.

FIG. 13 is a diagram showing the heating cylinder 1 before the heating cylinder protection cover 80 in this embodiment is attached.

In the heating cylinder, as in the heating cylinder 1 shown in FIG. 1, the three heating cylinder electric heaters 10, 11, and 12 are used. The three terminal boxes 4, 5, and 6 are arranged on the side surface of the heating cylinder 1 in association with the heating cylinder electric heaters 10, 11, and 12. However, phases of the terminal boxes 4, 5, and 6 in the heating cylinder circumferential direction of the terminal boxes 4, 5, and 6 are different from one another.

Figure 14:
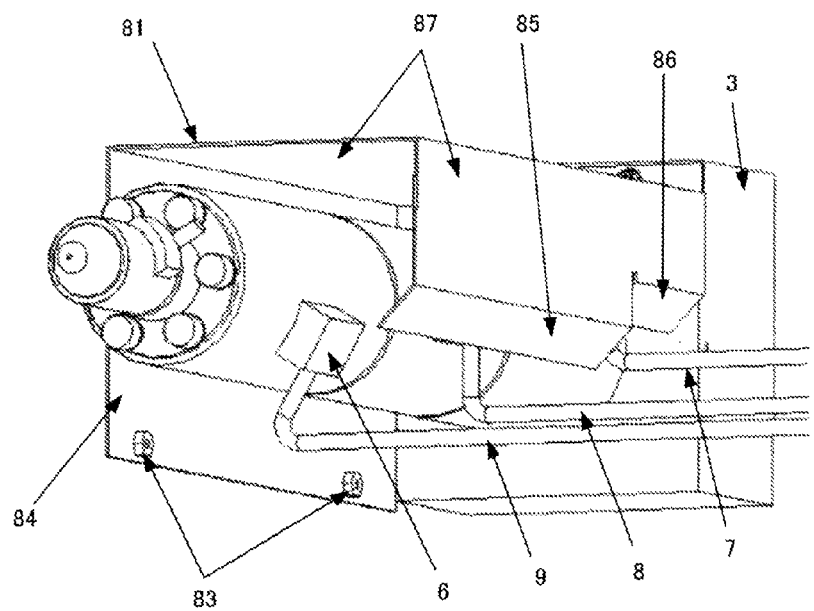
FIG. 14 is a diagram showing a state in which a first protection cover member configuring the heating cylinder protection cover according to the fifth embodiment of the present invention is fixed to a water cooling jacket shown in FIG. 13.

FIG. 14 is a diagram showing a state in which the first protection cover member 81 configuring the heating cylinder protection cover 80 in this embodiment is fixed to the water cooling jacket 3 shown in FIG. 13.

The first protection cover member 81 includes a first surface section 84 including first weld nuts 83, a second surface section 85 forming an angle of 45 degrees with respect to the first surface section 84, a third surface section 86 parallel to the second surface section 85, and connecting sections that connect the first surface section 84, the second surface section 85, and the third surface section 86. The connecting sections are configured from first and second plane sections 87. The first weld nuts 83 welded to the first surface section 84 of the first protection cover member 81 shown in FIG. 14 are the same as the first weld nuts 53 (FIG. 8) welded to the first surface section 54 of the first protection cover member 51 of the heating cylinder protection cover 50 in the third embodiment.

Figure 15:
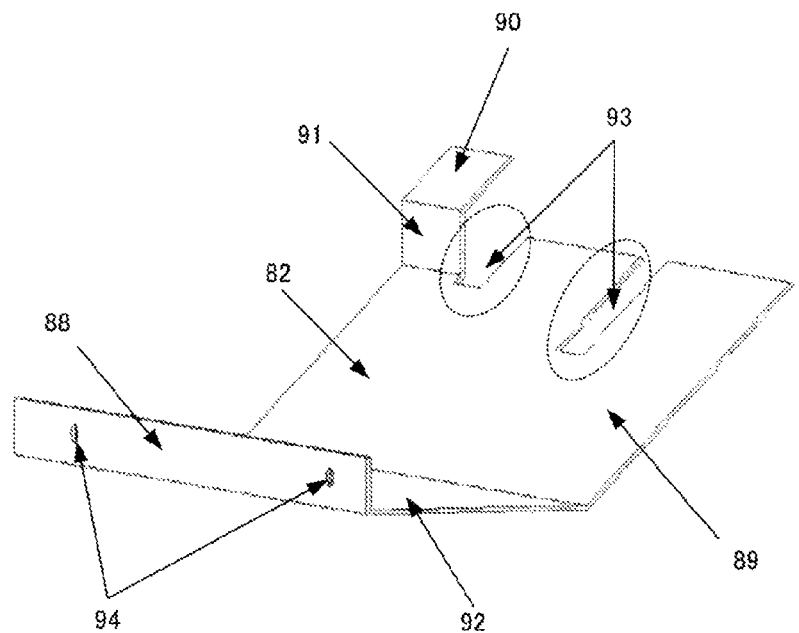
FIG. 15 is a diagram showing the shape of a second protection cover member configuring the heating cylinder protection cover according to the fifth embodiment of the present invention.

FIG. 15 is a diagram showing the shape of the second protection cover member 82 of the heating cylinder protection cover 80 shown in FIG. 14.

The second protection cover member 82 includes a fourth surface section 88 having first holes 94, a fifth surface section 89 forming an angle of 45 degrees with respect to the fourth surface section 88, and a sixth surface section 90 parallel to the fifth surface section 89. The second protection cover member 82 further includes a first connecting section (a first plane section 92) that connects the fourth surface section 88 and the fifth surface section 89 and a second connecting section (a second plane section 91) that connects the fifth surface section 89 and the sixth surface section 90.

In the second protection cover member 82, cutouts (cutouts for cable passing section formation) 93 are formed. The cutouts 93 are formed to form cable passing sections for drawing out the power supply cables 7 and 8 of the heating cylinder electric heaters 10 and 11 to the outer side of the heating cylinder protection cover 80 when the second protection cover member 82 is attached to the first protection cover member 81.

Figure 16:
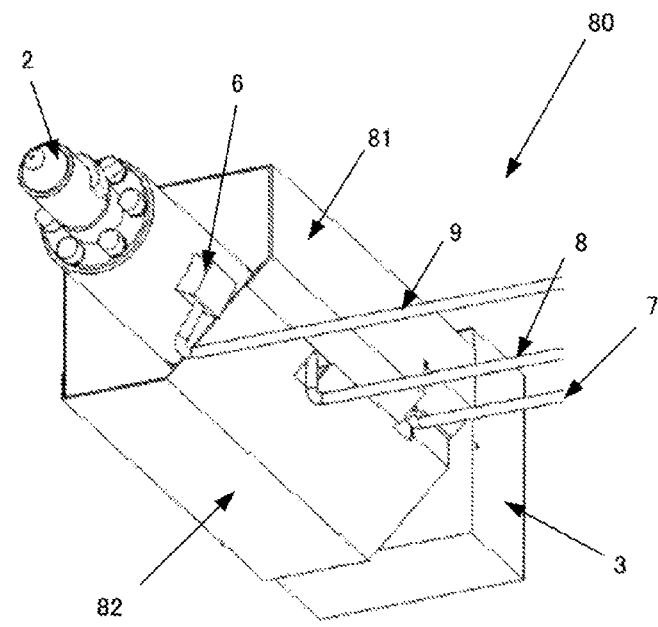
FIG. 16 is a diagram showing a state in which the second protection cover member shown in FIG. 15 is attached to the first protection cover member shown in FIG. 14.

The second protection cover member 82 can be attached to the first protection cover member 81 by moving the second protection cover member 82, with the fifth surface section 89 of the second protection cover member 82 located above the second surface section 85 of the first protection cover member 81 and with the sixth surface section 90 of the second protection cover member 82 located above the third surface section 86 of the first protection cover member 81, and inserting bolts (not shown in the figure) through the first holes 94 and fastening the screw sections of the bolts by the first weld nuts 83 (FIG. 14) welded to the first surface section 84 of the first protection cover member 8. In this case, as shown in FIG. 16, a part of the second surface section 85 of the first protection cover member 81 and a part of the fifth surface section 89 of the second protection cover member 82 overlap each other and a part of the third surface section 86 of the first protection cover member 81 and a part of the sixth surface section 90 of the second protection cover member 82 overlap each other. Consequently, a cable passing section is formed. It is possible to draw out the power supply cables 7 and 8 of the heating cylinder electric heaters 10 and 11 to the outer side of the heating cylinder protection cover 80 from the cable passing section.

In this embodiment, when the thickness of a material of the heating cylinder protection cover 80 is sufficiently large with respect to a screw pitch of the bolts, internal threads may be directly machined in the heating cylinder protection cover 80 instead of using the first weld nuts 83. The first and second plane sections 87, which are the connecting sections that connect the first surface section 84 and the second surface section 85 of the first protection cover member 81, may be formed using one plane or curved surface or a plurality of bent planes. Note that the fold 23 shown in FIG. 2 (the first embodiment) may be provided in the cutouts 93 for cable passing section formation (FIG. 15) formed in the second protection cover member 82.

A heating cylinder protection cover according to a sixth embodiment of the present invention is explained with reference to FIG. 5 and FIGS. 17 to 22.

A heating cylinder protection cover 100 in this embodiment is configured from a first protection cover member 101, a second protection cover member 102, and a third protection cover member 103.

The structure of the heating cylinder 1 to which the heating cylinder protection cover 100 is attached is as shown in FIG. 5. That is, the three heating cylinder electric heaters 10, 11, and 12 are used in the heating cylinder 1. The three terminal boxes 4, 5, and 6 are arranged on the side surface of the heating cylinder 1 to correspond to the heating cylinder electric heaters 10, 11, and 12.

The power supply cables 7, 8, and 9 of the heating cylinder electric heaters 10, 11, and 12 are drawn out downward to the outside (in the direction perpendicular to the axial direction of the heating cylinder 1) from the terminal boxes 4, 5, and 6. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 17:
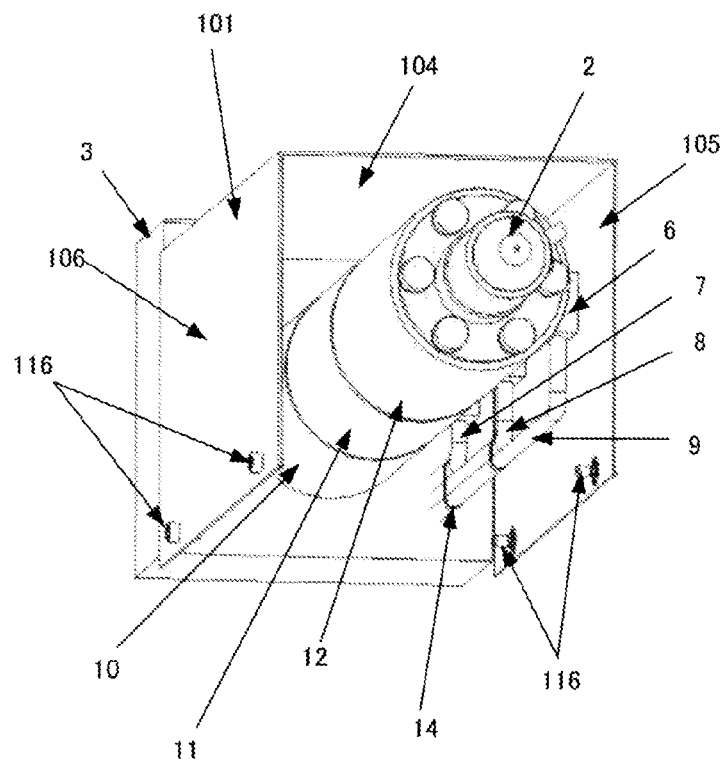
FIG. 17 is a diagram showing a state in which a first protection cover member configuring the heating cylinder protection cover according to the sixth embodiment of the present invention is fixed to the water cooling jacket of the injection molding machine shown in FIG. 5.

FIG. 17 is a diagram showing a state in which the first protection cover member 101 configuring the heating cylinder protection cover 100 in this embodiment is fixed to the water cooling jacket 3.

The first protection cover member 101 includes a first surface section 105 having first holes, a second surface section 106 having second holes, and a plane section 104, which is a connecting section that connects the first surface section 105 and the second surface section 106. Captive bolts 116 are inserted through the first holes and the second holes. Therefore, in FIG. 17, the first holes and the second holes are respectively hidden by the captive bolts 116.

Figure 18:
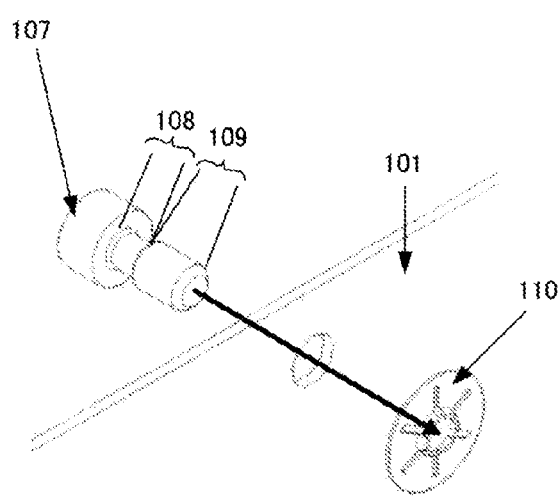
FIG. 18 is a diagram showing details of a captive bolts used in the first protection cover member configuring the heating cylinder protection cover shown in FIG. 17.

Details of the captive bolt 116 used in the first surface section 105 and the second surface section 106 are shown in FIG. 18.

The captive bolt 116 is a neck bolt 107 including a neck section 108 and a screw section 109. The neck section 108 and the screw section 109 of the neck bolt 107 are inserted through the holes of the protection cover member 101 (the first holes formed in the first surface section 105 and the second holes formed in the second surface section 106). Then, a stopper washer 110 is engaged with the neck bolt 107 (captive bolt 116) to nip the protection cover member 101 (the first surface section 105 and the second surface section 106) by means of the stopper washer 110.

Figure 19:
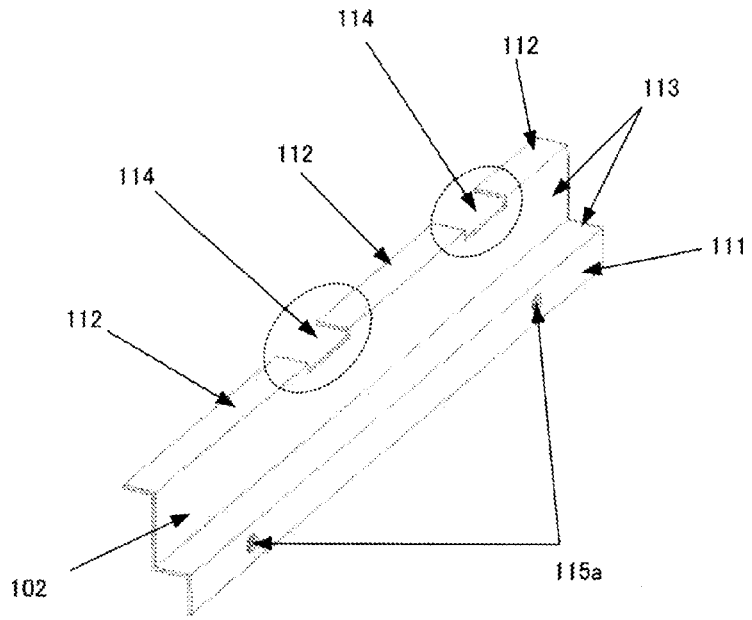
FIG. 19 is a diagram showing the shape of a second heating cylinder protection cover configuring the heating cylinder protection cover according to the sixth embodiment of the present invention.

The shape of the second protection cover member 102 of the heating cylinder protection cover 100 in this embodiment is shown in FIG. 19.

The second protection cover member 102 includes a third surface section 111 having first weld nuts 115a in positions corresponding to the first holes formed in the first surface section 105. The second protection cover member 102 further includes a fourth surface section 112 perpendicular to the third surface section 111 and located above the power supply cables 7, 8, and 9 of the heating cylinder electric heaters 10, 11, and 12 when attached to the first protection cover member 101 and two plane sections 113, which are connecting sections that connect the fourth surface section 112 and the third surface section 111.

The connecting sections that connect the third surface section 111 and the fourth surface section 112 in this embodiment are configured from two plane sections (first and second plane sections 113) bent at a right angle. In the second protection cover member 102, cutouts 114 for cable passing section formation are formed. The cutouts 114 are formed to form cable passing sections for drawing out the power supply cables 7 and 8 of the heating cylinder electric heaters 10 and 11 to the outer side of the heating cylinder protection cover 100 when the second protection cover member 102 is attached to the first protection cover member 101.

Figure 20:
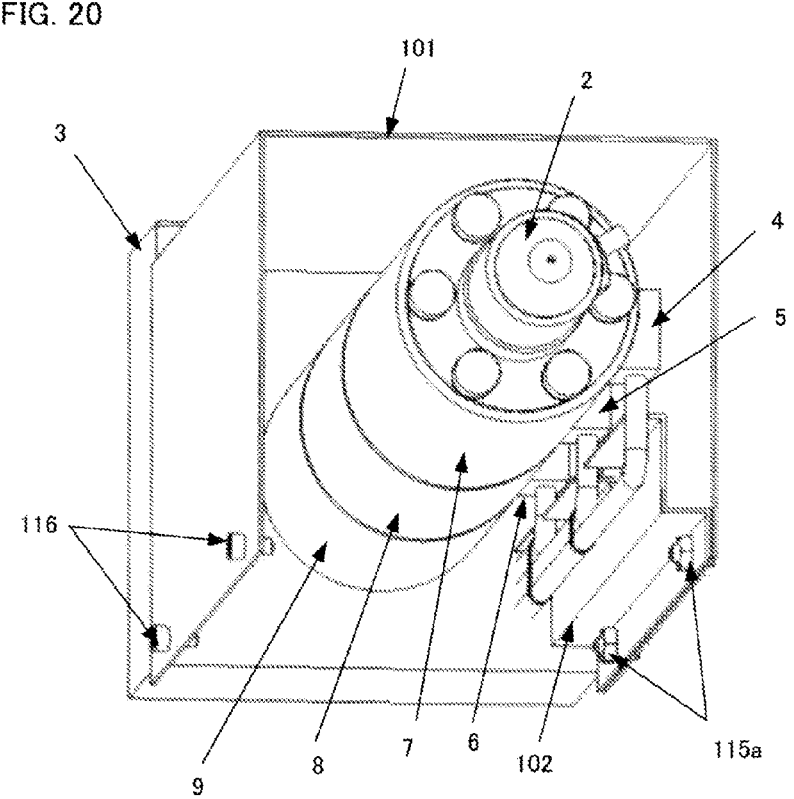
FIG. 20 is a diagram showing a state in which the second protection cover member shown in FIG. 19 is attached to the first protection cover member shown in FIG. 17.

The second protection cover member 102 is attached to the first protection cover member 101 by the captive bolts 116 inserted through the first holes of the first protection cover member 101. The second protection cover member 102 can be attached to the first protection cover member 101, as shown in FIG. 20, by moving the second protection cover member 102 and fastening the captive bolts 116 in the first holes formed in the first surface section 105 into the first weld nuts 115a (FIG. 19).

Figure 21:
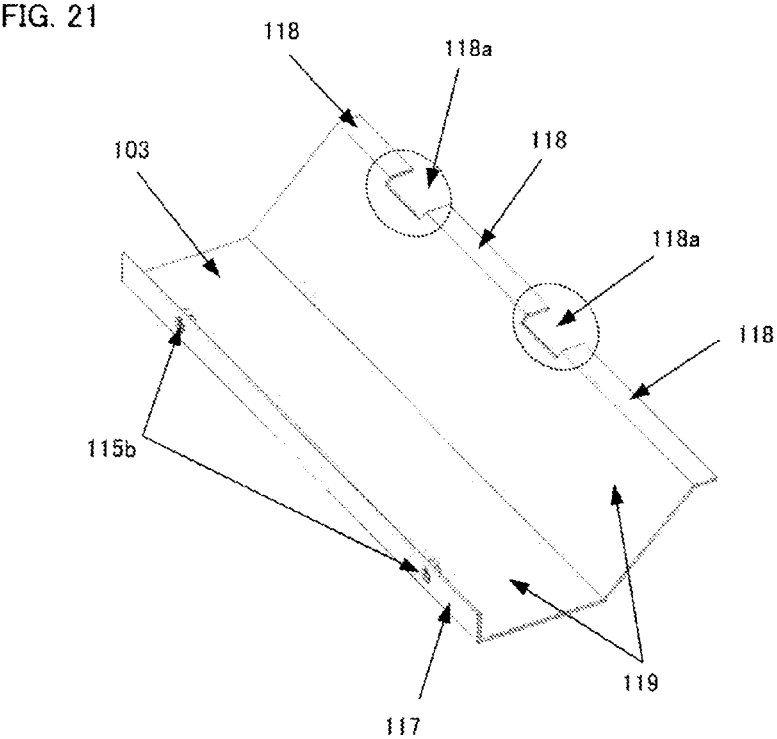
FIG. 21 is a diagram showing the shape of a third protection cover member configuring the heating cylinder protection cover according to the sixth embodiment of the present invention.

FIG. 21 is a diagram showing the shape of the third protection cover member 103 of the heating cylinder protection cover 100 in this embodiment.

The third protection cover member 103 includes a fifth surface section 117 having second weld nuts 115b in positions corresponding to the second holes formed in the second surface section 106. The third protection cover member 103 further includes a sixth surface section 118 perpendicular to the fifth surface section 117 and located above the fourth surface section 112 of the second protection cover member 102 when attached to the first protection cover member 101 and two plane sections 119, which are connecting sections that connect the sixth surface section 118 and the fifth surface section 117.

The connecting sections that connect the fifth surface section 117 and the sixth surface section 118 in this embodiment are configured from two plane sections (first and second plane sections 119) bent to form an angle of 135 degrees. In the third protection cover member 103, cutouts 118a for cable passing section formation are formed. The cutouts 118a are formed to form cable passing sections for drawing out the power supply cables 7 and 8 of the heating cylinder electric heaters 10 and 11 to the outer side of the heating cylinder protection cover 100 when the third protection cover member 103 is attached to the first protection cover member 101.

The first weld nuts 115a shown in FIG. 20 and the second weld nuts 115b shown in FIG. 21 are the same as the first weld nuts 53 shown in FIG. 8 (the third embodiment). With the sixth surface section 118 of the third protection cover member 103 located above the fourth surface section 112 of the second protection cover member 102 attached earlier, the third protection cover member 103 is moved and the captive bolts 116 inserted through the second holes of the first protection cover member 101 are fastened into the second weld nuts 115b (FIG. 21). Consequently, the third protection cover member 103 is attached to the first protection cover member 101.

Figure 22:
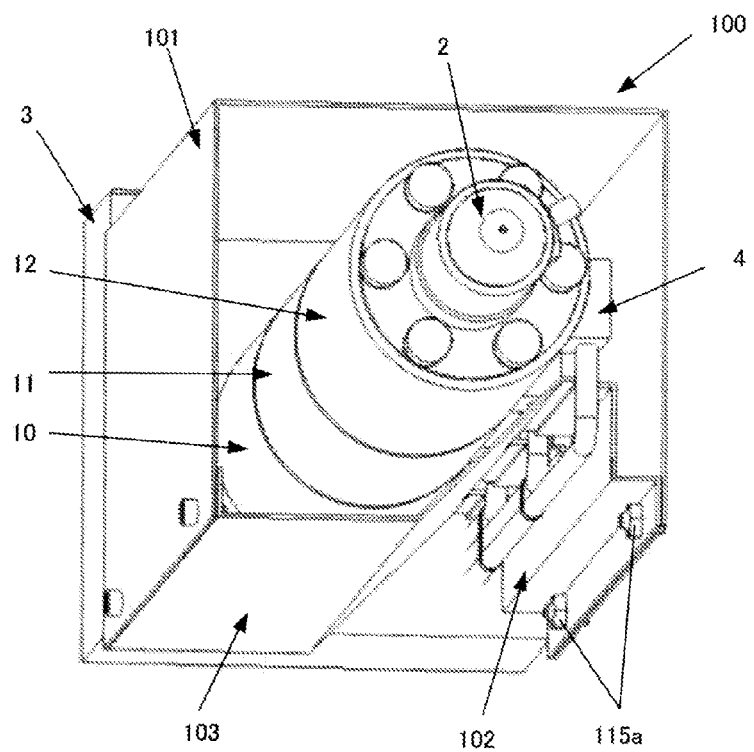
FIG. 22 is a diagram showing a state in which the second protection cover member shown in FIG. 19 and the third protection cover member shown in FIG. 21 are attached to the first protection cover member shown in FIG. 17.

As shown in FIG. 22, a part of the fourth surface section 112 and a part of the sixth surface section 118 overlap each other. Consequently, a cable passing section is formed, so that it is possible to draw out the power supply cables 7, 8, and 9 of the heating cylinder electric heaters 10, 11, and 12 to the outer side of the heating cylinder protection cover 100 from the cable passing section without untying the power supply cables 7, 8, and 9 of the heating cylinder electric heaters 10, 11, and 12 bundled into one cable by the tying bands 14.

In this embodiment, when the thickness of a material of the heating cylinder protection cover 100 is sufficiently large with respect to a screw pitch of the captive bolts 116, internal threads may be directly machined in the heating cylinder protection cover 100 instead of using the first weld nuts 115a and the second weld nuts 115b. One plane section of the connecting section (the plane section 104 of the connecting section) that connects the first surface section 105 and the second surface section 106 of the first protection cover member 101 may be formed using a curved surface or a plurality of bent planes. The two plane sections (the first and second plane sections 113), which are the connecting sections that connect the third surface section 111 and the fourth surface section 112 of the second protection cover member 102, and the two plane sections (the first and second plane sections 119), which are the connecting sections that connect the fifth surface section 117 and the sixth surface section 118 of the third protection cover member 103, may be formed using one plane or curved surface or a plurality of bent planes. Note that the fold 23 shown in FIG. 2 (the first embodiment) may be provided in the cutouts 118a for cable passing section formation (FIG. 21) formed in the third protection cover member 103.

A heating cylinder protection cover according to a seventh embodiment of the present invention is explained with reference to FIGS. 23 to 28.

A heating cylinder protection cover 120 in this embodiment is configured from a first protection cover member 121, a second protection cover member 122, and a third protection cover member 123.

Figure 23:
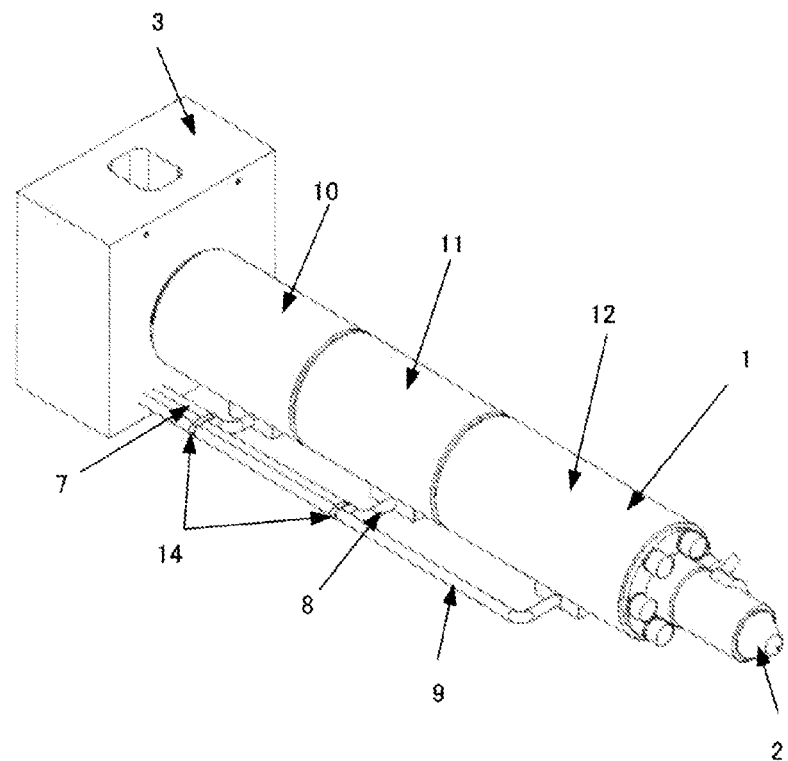
FIG. 23 is a diagram showing the structure of a heating cylinder of an injection molding machine to which a heating cylinder protection cover according to a seventh embodiment of the present invention is attached.

FIG. 23 is a diagram showing the structure of the heating cylinder 1 to which the heating cylinder protection cover 120 in this embodiment is attached.

In the heating cylinder 1, the three heating cylinder electric heaters 10, 11, and 12 are used. The three terminal boxes 4, 5, and 6 are arranged under the heating cylinder 1 to correspond to the heating cylinder electric heaters 10, 11, and 12. The power supply cables 7, 8, and 9 of the heating cylinder electric heaters 10, 11, and 12 are drawn out in the horizontal direction to the outside from the terminal boxes 4, 5, and 6. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 24:
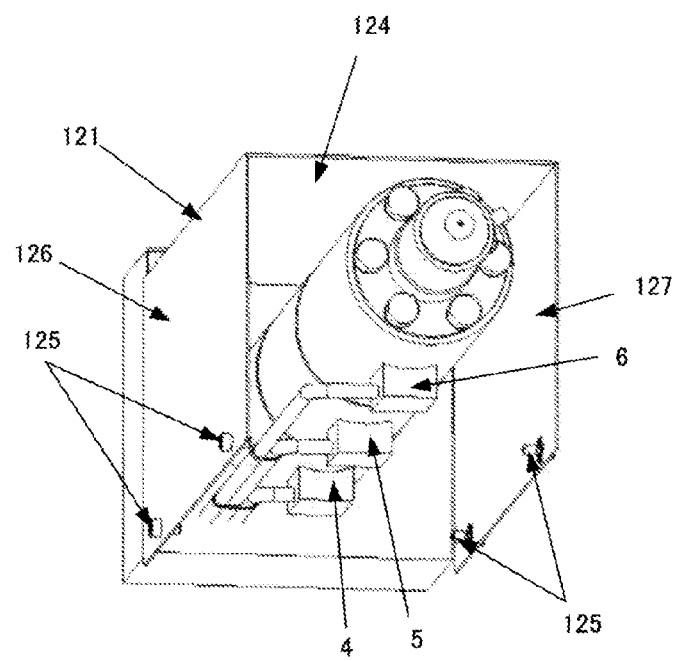
FIG. 24 is a diagram showing a state in which a first protection cover member configuring the heating cylinder protection cover according to the seventh embodiment of the present invention is fixed to a water cooling jacket shown in FIG. 23.

FIG. 24 is a diagram showing a state in which the first protection cover member 121 configuring the heating cylinder protection cover 120 in this embodiment is fixed to the water cooling jacket 3.

The first protection cover member 121 includes a first surface section 126 having first holes, a second surface section 127 having second holes, and a plane section 124, which is a connecting section that connects the first surface section 126 and the second surface section 127. Captive bolts 125 are inserted through the first holes and the second holes shown in FIG. 24. Therefore, the first holes and the second holes are hidden by the captive bolts 125. The captive bolts 125 in this embodiment are the same as the captive bolts 116 (the sixth embodiment) shown in FIG. 17.

Figure 25:
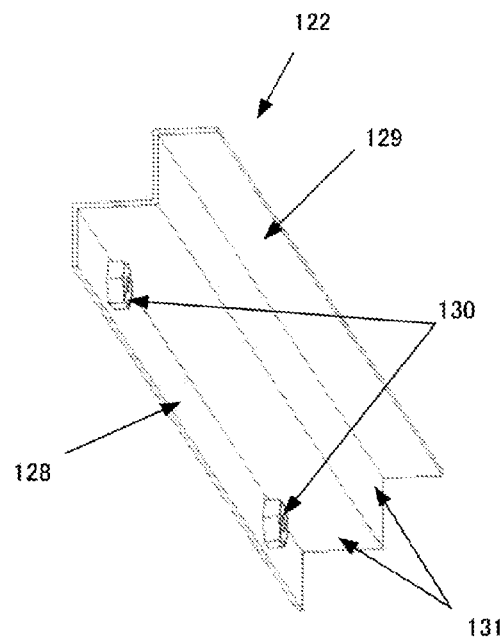
FIG. 25 is a diagram showing the shape of a second protection cover member configuring the heating cylinder protection cover according to the seventh embodiment of the present invention.

FIG. 25 is a diagram showing the shape of the second protection cover member 122 configuring the heating cylinder protection cover 120 in this embodiment.

The second protection cover member 122 includes a third surface section 128 having first weld nuts 130 in positions corresponding to the first holes. The second protection cover member 122 further includes a fourth surface section 129 perpendicular to the third surface section 128 and located above the power supply cables 7, 8, and 9 of the heating cylinder electric heaters 10, 11, and 12 when attached to the first protection cover member 121 and two plane sections (first and second plane sections 131), which are connecting sections that connect the fourth surface section 129 and the third surface section 128. The connecting sections that connect the third surface section 128 and the fourth surface section 129 are configured from the two plane sections (the first and second plane sections 131) bent at a right angle.

Figure 26:
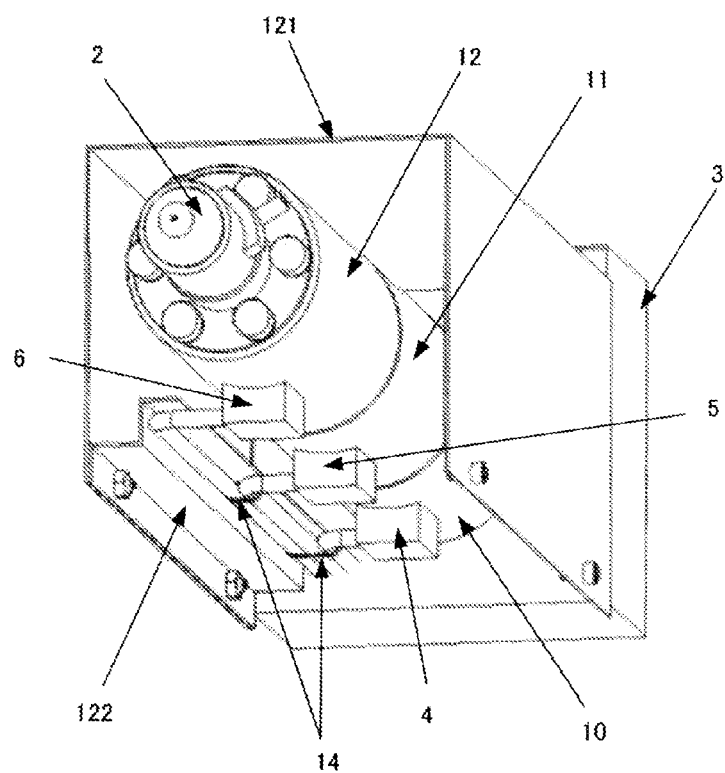
FIG. 26 is a diagram showing a state in which the second protection cover member shown in FIG. 25 is attached to the first protection cover member shown in FIG. 24.

The second protection cover member 122 can be attached to the first protection cover member 121, as shown in FIG. 26, by moving the second protection cover member 122 shown in FIG. 25 and fastening the captive bolts 125 inserted through the first holes formed in the first surface section 126 of the first protection cover member 121 into the first weld nuts 130 (FIG. 25) welded to the third surface section 128 of the second protection cover member 122.

Figure 27:
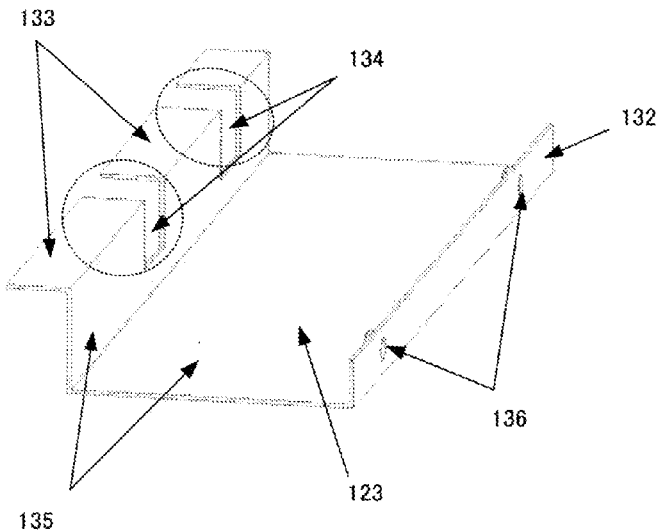
FIG. 27 is a diagram showing the shape of a third protection cover member configuring the heating cylinder protection cover according to the seventh embodiment of the present invention.

FIG. 27 is a diagram showing the shape of the third protection cover member 123 configuring the heating cylinder protection cover 120 in this embodiment.

The third protection cover member 123 includes a fifth surface section 132 having second weld nuts 136 in positions corresponding to the second holes. The third protection cover member 123 further includes a sixth surface section 133 perpendicular to the fifth surface section 132 and located above the fourth surface section 129 of the second protection cover member 122 when attached to the first protection cover member 121 and two plane sections (first and second plane sections 135), which are connecting sections that connect the sixth surface section 133 and the fifth surface section 132.

The connecting sections that connect the fifth surface section 132 and the sixth surface section 133 are configured from the two plane sections (the first and second plane sections 135) bent at a right angle. In the third protection cover member 123, cutouts 134 for cable passing section formation are formed. The cutouts 134 are formed to form cable passing sections for drawing out the power supply cables 7 and 8 of the heating cylinder electric heaters 10 and 11 to the outer side of the heating cylinder protection cover 120 when the third protection cover member 123 is attached to the first protection cover member 121. The first weld nuts 130 (FIG. 25) welded to the third surface section 128 of the second protection cover member 122 and the second weld nuts 136 (FIG. 27) welded to the fifth surface section 132 of the third protection cover member 123 are the same as the first weld nuts 53 (the third embodiment) shown in FIG. 8.

The third protection cover member 123 can be attached to the first protection cover member 121, by moving the third protection cover member 123 is moved with the sixth surface section 133 of the third protection cover member 123 located above the fourth surface section 129 of the second protection cover member 122 attached earlier, and fastening the captive bolts 125 (FIG. 24) inserted through the second holes of the second surface section 127 of the first protection cover member 121 into the second weld nuts 136 (FIG. 27) welded to the fifth surface section 132 of the third protection cover member 123.

Figure 28:
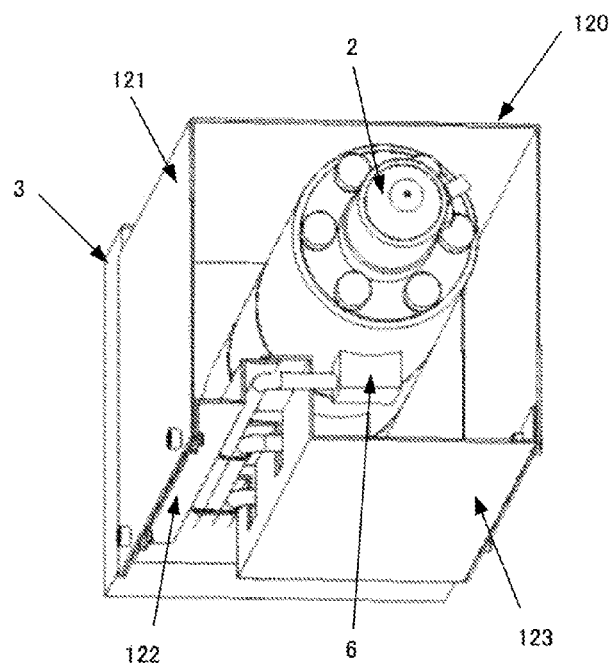
FIG. 28 is a diagram showing a state in which the second protection cover member shown in FIG. 25 and the third protection cover member shown in FIG. 27 are attached to the first protection cover member shown in FIG. 24.

As shown in FIG. 28, a part of the fourth surface section 129 and a part of the sixth surface section 133 overlap each other. Consequently, a cable passing section is formed, so that it is possible to draw out the power supply cables 7, 8, and 9 of the heating cylinder electric heaters 10, 11, and 12 to the outer side of the heating cylinder protection cover 120 from the cable passing section without untying the power supply cables 7, 8, and 9 of the heating cylinder electric heaters 10, 11, and 12 bundled into one cable by the tying bands 14.

In this embodiment, when the thickness of a material of the heating cylinder protection cover 120 is sufficiently large with respect to a screw pitch of the captive bolts 125, internal threads may be directly machined in the heating cylinder protection cover 120 instead of using the first weld nuts 130 and the second weld nuts 136. The plane section 124, which is the connecting section that connects the first surface section 126 and the second surface section 127 of the first protection cover member 121, may be formed using a curved surface or a plurality of bent planes. The first and second plane sections 131, which are the connecting sections that connect the third surface section 128 and the fourth surface section 129 of the second protection cover member 122, and the first and second plane sections 135, which are the connecting sections that connect the fifth surface section 132 and the sixth surface section 133 of the third protection cover member 123, may be formed using one plane or curved surface or a plurality of bent planes. Note that the fold 23 shown in FIG. 2 (the first embodiment) may be provided in the cutouts 134 for cable passing section formation (FIG. 27) formed in the third protection cover member 123.

A heating cylinder protection cover according to an eighth embodiment of the present invention is explained with reference to FIGS. 29 to 34.

A heating cylinder protection cover 140 in this embodiment is configured from a first protection cover member 141, a second protection cover member 142, and a third protection cover member 143.

The structure of the heating cylinder 1 to which the heating cylinder protection cover 140 is attached is as shown in FIG. 5. That is, the three heating cylinder electric heaters 10, 11, and 12 are used in the heating cylinder 1. The three terminal boxes 4, 5, and 6 are arranged on the side surface of the heating cylinder 1 to correspond to the heating cylinder electric heaters 10, 11, and 12.

The power supply cables 7, 8, and 9 of the heating cylinder electric heaters 10, 11, and 12 are drawn out downward to the outside (in the direction perpendicular to the axial direction of the heating cylinder 1) from the terminal boxes 4, 5, and 6. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 29:
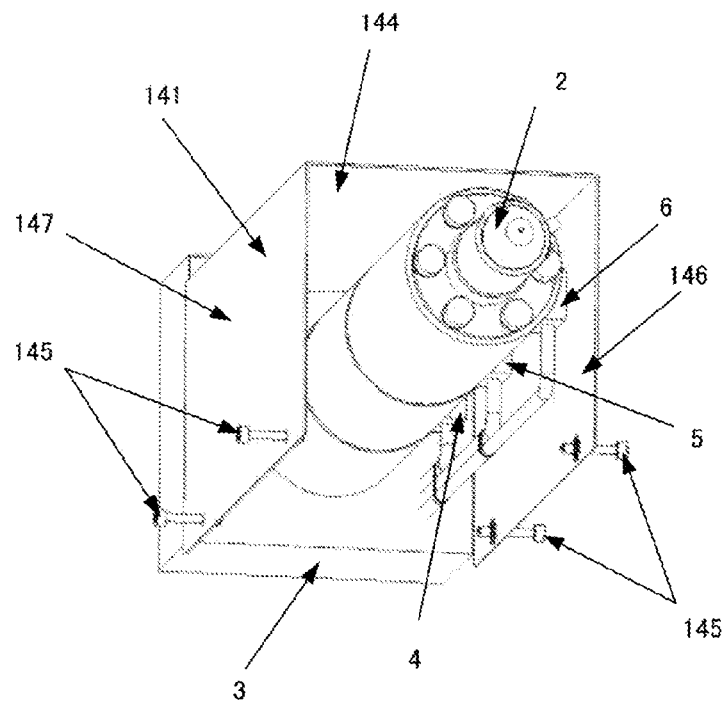
FIG. 29 is a diagram showing a state in which a first protection cover member configuring the heating cylinder protection cover according to the eighth embodiment of the present invention is fixed to a water cooling jacket.
Figure 30:
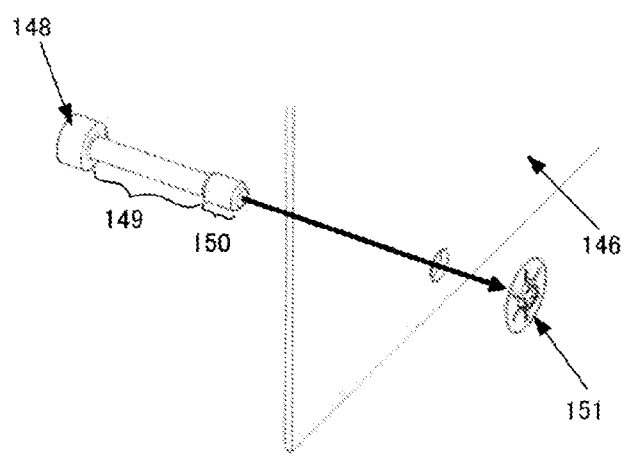
FIG. 30 is a diagram showing details of a captive bolt used in the first protection cover member configuring the heating cylinder protection cover shown in FIG. 29.

FIG. 29 is a diagram showing a state in which the first protection cover member 141 is fixed to the water cooling jacket 3.

The first protection cover member 141 includes a first surface section 146 having first holes, a second surface section 147 having second holes, and a first plane section 144, which is a connecting section that connects the first surface section 146 and the second surface section 147. Captive bolts 145 are inserted through the first holes and the second holes. Therefore, the first holes and the second holes are respectively hidden by the captive bolts 145.

The captive bolt 145 is a neck bolt 148 including a long neck section 149 and a screw section 150. The neck bolt 148 is inserted through the hole formed in the first surface section 146 of the protection cover member 141. Then a stopper washer 151 is engaged with the neck bolt 148 (captive bolt 145) to nip the first surface section 146 of the protection cover member 141 by means of the stopper washer 151.

Figure 31:
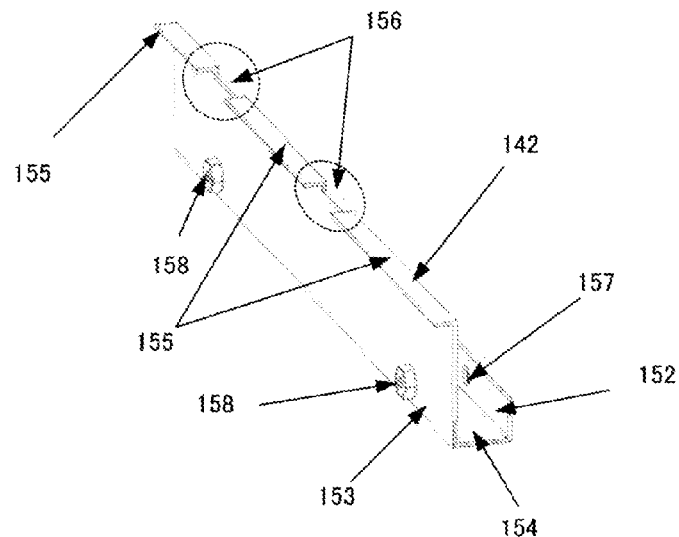
FIG. 31 is a diagram showing the shape of a second protection cover member configuring the heating cylinder protection cover according to the eighth embodiment of the present invention.

FIG. 31 is a diagram showing the shape of the second protection cover member 142 of the heating cylinder protection cover 140 in this embodiment.

The second protection cover member 142 includes a third surface section 152 having third holes 157 in positions corresponding to the first holes formed in the first surface section 146 of the first protection cover member 141 and a fourth surface section 153 parallel to the third surface section 152 and having first weld nuts 158 provided coaxially with the third holes 157. The third surface section 152 and the fourth surface section 153 are formed by bending one plane in a rectangular wave shape. The third surface section 152 and the fourth surface section 153 are connected by one plane section (a fifth surface section 154). The second protection cover member 142 further includes a sixth surface section 155 perpendicular to the fourth surface section 153 and located above the power supply cables 7, 8, and 9 of the heating cylinder electric heaters 10, 11, and 12 when attached to the first protection cover member 141.

In the second protection cover member 142, cutouts 156 for cable passing section formation are formed. The cutouts 156 are formed to form cable passing sections for drawing out the power supply cables 7 and 8 of the heating cylinder electric heaters 10 and 11 to the outer side of the heating cylinder protection cover 140 when the second protection cover member 142 is attached to the first protection cover member 141.

Figure 32:
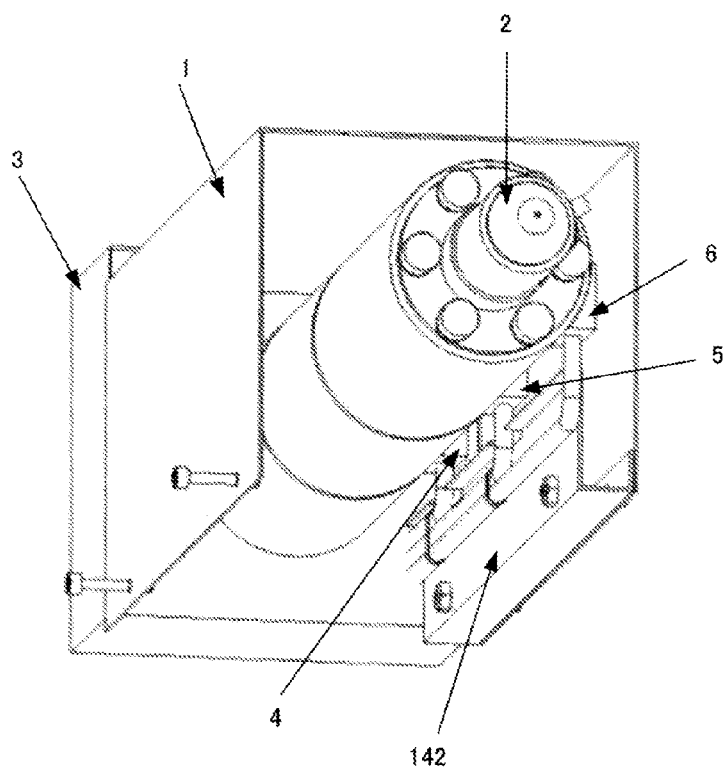
FIG. 32 is a diagram showing a state in which the second protection cover member shown in FIG. 31 is attached to the first protection cover member shown in FIG. 29.

The second protection cover member 142 is attached to the first protection cover member 141 by the captive bolts 145 of the first holes of the first protection cover member 141. The second protection cover member 142 can be attached to the first protection cover member 141, as shown in FIG. 32, by moving the second protection cover member 142, and inserting the captive bolts 145 (FIG. 29), inserted through the first holes formed in the first surface section 146 of the first protection cover member 141, through the third holes 157 (FIG. 31) formed in the third surface section 152 of the second protection cover member 142, and fastening the captive bolts 145 into the first weld nuts 158 welded to the fourth surface section 153 of the second protection cover member 142 (FIG. 31).

Figure 33:
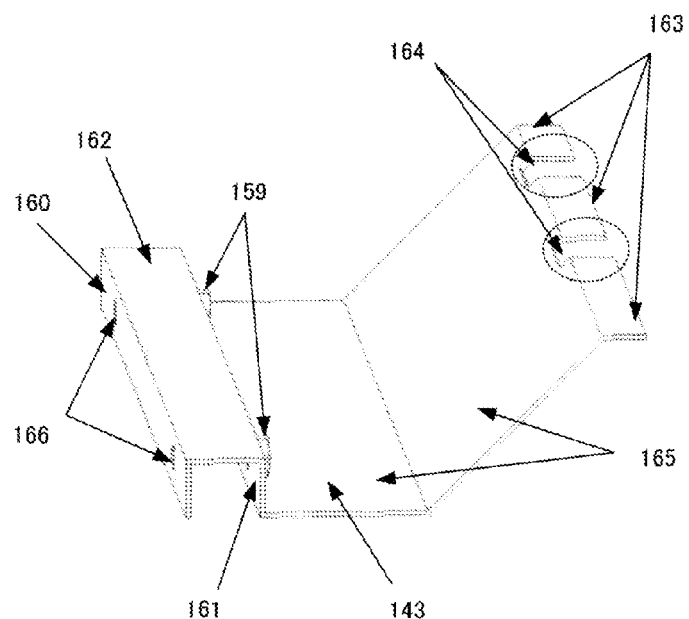
FIG. 33 is a diagram showing the shape of a third protection cover member configuring the heating cylinder protection cover according to the eighth embodiment of the present invention.

FIG. 33 is a diagram showing the shape of the third protection cover member 143 configuring the heating cylinder protection cover 140 in this embodiment.

The third protection cover member 143 includes a seventh surface section 160 having fourth holes 166 in positions corresponding to the second holes formed in the second surface section 147 of the first protection cover member 141 and an eighth surface section 161 parallel to the seventh surface section 160 and having second weld nuts 159 provided coaxially with the fourth holes 166. The seventh surface section 160 and the eighth surface section 161 are formed by bending a plane in a rectangular wave shape. The seventh surface section 160 and the eighth surface section 161 are connected by one plane section (a ninth surface section 162). The third protection cover member 143 further includes a tenth surface section 163 perpendicular to the eighth surface section 161 and located above the sixth surface section 155 of the second protection cover member 141 when attached to the first protection cover member 141, and two plane sections 165 of connecting sections that connect the tenth surface section 163 and the eighth surface section 161. The connecting sections that connect the eighth surface section 161 and the tenth surface section 163 are configured from two plane sections (the plane sections 165 of the connecting sections) bent to form an angle of 135 degrees.

In the third protection cover member 143, cutouts 164 for cable passing section formation are formed. The cutouts 164 are formed to form cable passing sections for drawing out the power supply cables 7 and 8 of the heating cylinder electric heaters 10 and 11 to the outer side of the heating cylinder protection cover 140 when the third protection cover member 143 is attached to the first protection cover member 141.

The first weld nuts 158 welded to the fourth surface section 153 of the second protection cover member 142 and the second weld nuts 159 welded to the eighth surface section 161 of the third protection cover member 143 are the same as the weld nuts 53 in the third embodiment (see FIG. 8). The third protection cover member 143 can be attached to the first protection cover member 141 by moving the third protection cover member 143, with the tenth surface section 163 of the third protection cover member 143 located above the sixth surface section 155 of the second protection cover member 142 attached earlier, and inserting the captive bolts of the second holes of the first protection cover member 141 through the fourth holes (the holes 166), and fastening the captive bolts into the second weld nuts 159 (FIG. 33).

Figure 34:
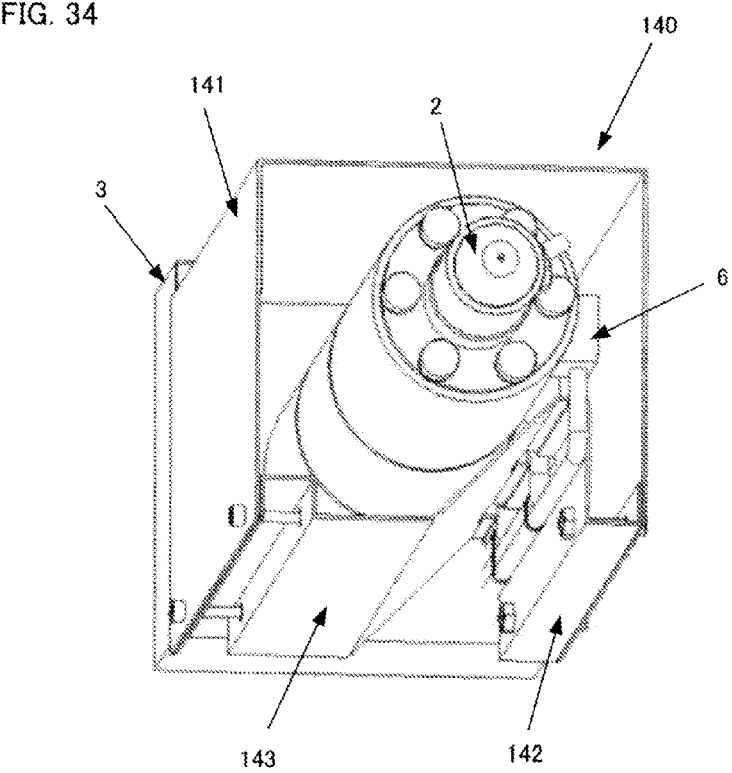
FIG. 34 is a diagram showing a state in which the second protection cover member shown in FIG. 31 and the third protection cover member shown in FIG. 33 are attached to the first protection cover member shown in FIG. 29.

As shown in FIG. 34, a part of the sixth surface section 155 of the second protection cover member 142 and a part of the tenth surface section 163 of the third protection cover member 143 overlap each other. Consequently, a cable passing section is formed, so that it is possible to draw out the power supply cables 7, 8, and 9 of the heating cylinder electric heaters 10, 11, and 12 to the outer side of the heating cylinder protection cover 140 from the cable passing section without untying the power supply cables 7, 8, and 9 of the heating cylinder electric heaters 10, 11, and 12 bundled into one cable by the tying bands 14.

In this embodiment, the third surface section 152 of the second protection cover member 142, parallel to the fourth surface section 153 of the second protection cover member 142 and located on the outer side, comes into contact with the first surface section 146 of the first protection cover member 141. Consequently, an interval between the fourth surface section 153 of the second protection cover member 142 that has the first weld nuts 158 and the first surface section 146 of the first protection cover member 141 is retained by the fifth surface section 154 of the second protection cover member 142. Therefore, there is a degree of freedom in movement in the axial direction of the neck bolt 148 (the captive bolt 145) having the long neck section 149. Consequently, even if the captive bolts 145 present in a plurality of places are drawn out from the first weld nuts 158 one by one, the first surface section 146 of the first protection cover member 141 are not deformed. The same applies to the seventh surface section 160, the eighth surface section 161, and the ninth surface section 162 of the third protection cover member 143 and the second surface section 147 of the first protection cover member 141.

In this embodiment, when the thickness of a material of the heating cylinder protection cover 140 is sufficiently large with respect to a screw pitch of the captive bolts 145 and stopper bolts, internal threads may be directly machined in the heating cylinder protection cover 140 instead of using the first weld nuts 158 and the second weld nuts 159. One plane section (the plane section 144), which is the connecting section that connects the first surface section 146 and the second surface section 147 of the first protection cover member 141, and the fifth surface section 154 of the second protection cover member 142 and the ninth surface section 162 of the third protection cover member 143 may be formed using a curved surface or a plurality of bent planes. The two plane sections (the first and second plane sections 165), which are the connecting sections that connect the eighth surface section 161 and the tenth surface section 163 of the third protection cover member 143, may be formed using one plane or curved surface or a plurality of bent planes. The fold shown in FIG. 2 in the first embodiment may be provided in the cable passing section in this embodiment.

A heating cylinder protection cover according to a ninth embodiment of the present invention is explained with reference to FIGS. 35 to 39.

A heating cylinder protection cover 170 in this embodiment is configured from a first protection cover member 171, a second protection cover member 172, and a third protection cover member 173.

The structure of the heating cylinder 1 to which the heating cylinder protection cover 170 is attached is as shown in FIG. 23. That is, the three heating cylinder electric heaters 10, 11, and 12 are used in the heating cylinder 1. The three terminal boxes 4, 5, and 6 are arranged on the side surface of the heating cylinder 1 to correspond to the heating cylinder electric heaters 10, 11, and 12.

The power supply cables 7, 8, and 9 of the heating cylinder electric heaters 10, 11, and 12 are drawn out in the horizontal direction to the outside from the terminal boxes 4, 5, and 6 located in the downward direction. Then, the power supply cables 7, 8, and 9 extend with the direction changed to the axial direction of the heating cylinder 1. In this case, the power supply cables 7, 8, and 9 of the heating cylinder electric heaters 10, 11, and 12 are bundled into one cable by the tying bands 14 respectively in a place where two cables merge and a place where three cables merge.

Figure 35:
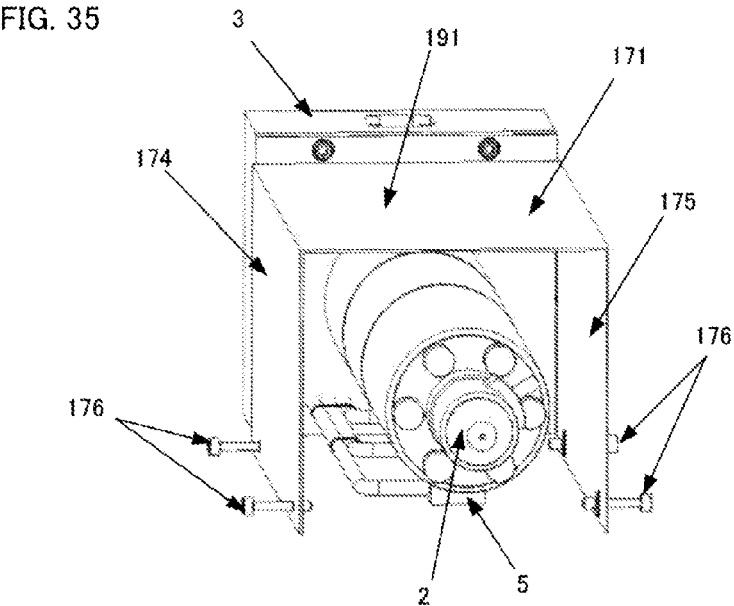
FIG. 35 is a diagram showing a state in which a first protection cover member configuring the heating cylinder protection cover according to a ninth embodiment of the present invention is fixed to the water cooling jacket shown in FIG. 23.

FIG. 35 is a diagram showing a state in which the first protection cover member 171 configuring the heating cylinder protection cover 170 is fixed to the water cooling jacket 3.

The first protection cover member 171 includes a first surface section 174 having first holes, a second surface section 175 having second holes, and a plane section 191, which is a connecting section that connects the first surface section 174 and the second surface section 175. Captive bolts 176 are respectively inserted through the first holes and the second holes. Therefore, in FIG. 35, the first holes and the second holes are respectively hidden by the captive bolts 176. The captive bolts 176 are the same as the captive bolts 145 shown in FIG. 29 (the eighth embodiment).

Figure 36:
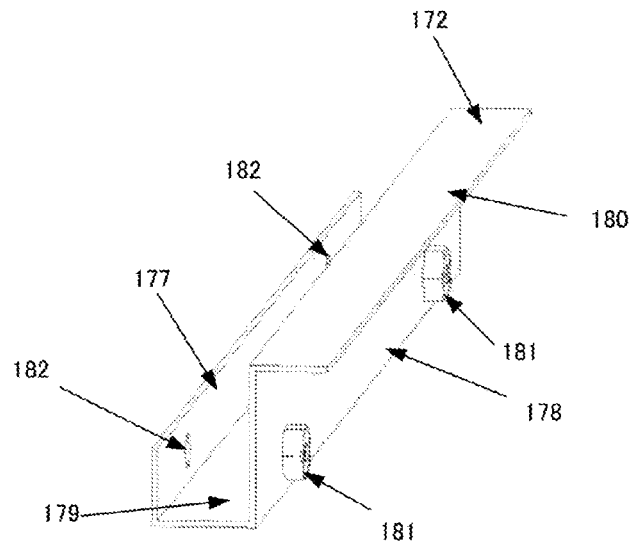
FIG. 36 is a diagram showing the shape of a second protection cover member configuring the heating cylinder protection cover according to the ninth embodiment of the present invention.

FIG. 36 is a diagram showing the shape of the second protection cover member 172 of the heating cylinder protection cover 170 in this embodiment.

The second protection cover member 172 includes a third surface section 177 having third holes 182 in positions corresponding to the first holes formed in the first surface section 174 of the first protection cover member 171 and a fourth surface section 178 parallel to the third surface section 177 and having first weld nuts 181 provided coaxially with the third holes 182. The third surface section 177 and the fourth surface section 178 are formed by bending a plane in a rectangular wave shape. The third surface section 177 and the fourth surface section 178 are connected by a fifth surface section 179. The second protection cover member 172 further includes a sixth surface section 180 perpendicular to the fourth surface section 178 and located above the power supply cables 7, 8, and 9 of the heating cylinder electric heaters 10, 11, and 12 when attached to the first protection cover member 171.

Figure 37:
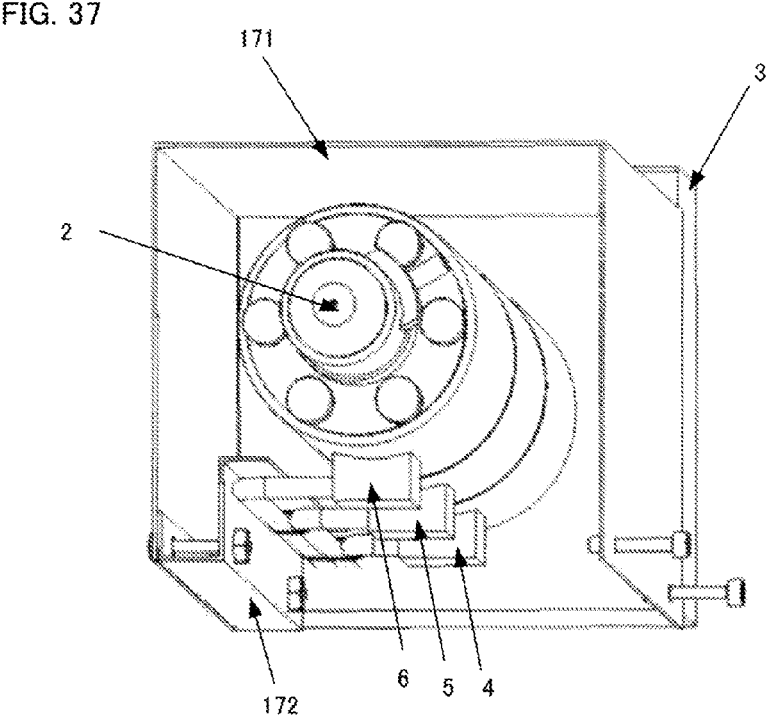
FIG. 37 is a diagram showing a state in which the second protection cover member shown in FIG. 36 is attached to the first protection cover member shown in FIG. 35.

The second protection cover member 172 can be attached to the first protection cover member 171, as shown in FIG. 37, by moving the second protection cover member 172, and inserting the captive bolts 176, inserted through the first holes of the first surface section 174 of the first protection cover member 171, through the third holes 182 of the second protection cover member 172, and fastening the captive bolts 176 into the first weld nuts 181 (FIG. 36) welded to the fourth surface section 178 of the second protection cover member 172.

Figure 38:
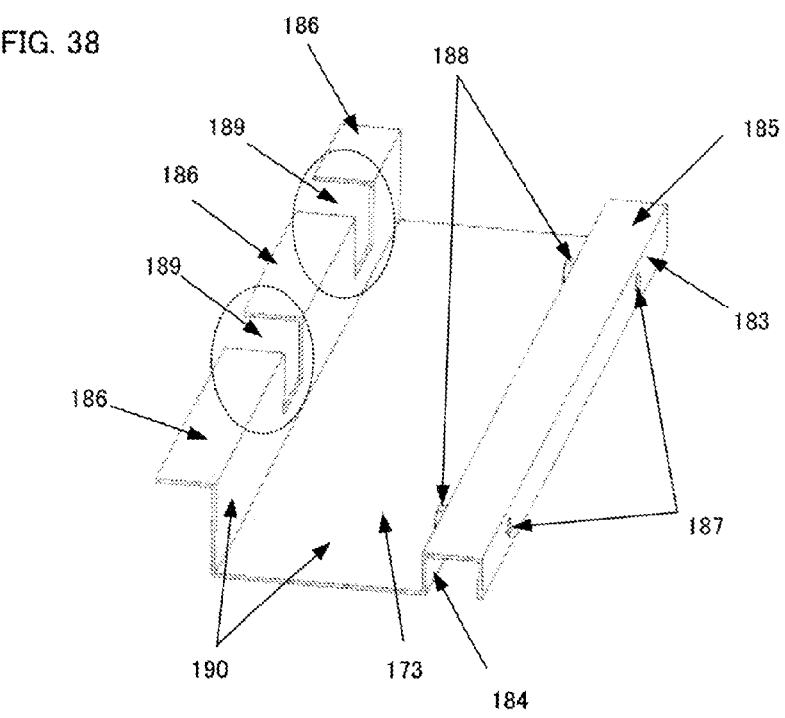
FIG. 38 is a diagram showing the shape of a third protection cover member configuring the heating cylinder protection cover according to the ninth embodiment of the present invention.

FIG. 38 is a diagram showing the shape of the third protection cover member 173 configuring the heating cylinder protection cover 170 in this embodiment.

The third protection cover member 173 includes a seventh surface section 183 having fourth holes (holes 187) in positions corresponding to the second holes formed in the second surface section 175 of the first protection cover member 171 and an eighth surface section 184 parallel to the seventh surface section 183 and having second weld nuts 188 provided coaxially with the fourth holes (the holes 187). The seventh surface section 183 and the eighth surface section 184 are formed by bending a plane in a rectangular wave shape. The seventh surface section 183 and the eighth surface section 184 are connected by a ninth surface section 185.

The third protection cover member 173 further includes a tenth surface section 186 perpendicular to the eighth surface section 184 and located above the sixth surface section 180 of the second protection cover member 172 when attached to the first protection cover member 171 and first and second plane sections 190, which are connecting sections that connect the tenth surface section 186 and the eighth surface section 184. The connecting sections that connect the eighth surface section 184 and the tenth surface section 186 are configured from two plane sections (the plane sections 190 of the connecting sections) bent at a right angle.

In the third protection cover member 173, cutouts 189 for cable passing section formation are formed. The cutouts 189 are formed to form cable passing sections for drawing out the power supply cables 7 and 8 of the heating cylinder electric heaters 10 and 11 to the outer side of the heating cylinder protection cover 170 when the third protection cover member 173 is attached to the first protection cover member 171.

The first weld nuts 181 welded to the fourth surface section 178 of the second protection cover member 172 and the second weld nuts 188 welded to the eighth surface section 184 of the third protection cover member 173 are the same as the weld nuts 53 shown in FIG. 8 (the third embodiment).

The third protection cover member 173 can be attached to the first protection cover member 171 by moving the third protection cover member 173, with the tenth surface section 186 of the third protection cover member 173 located above the sixth surface section 180 of the second protection cover member 172 attached earlier, and inserting the captive bolts 176 in the second holes of the first protection cover member 171 through the fourth holes 187 of the seventh surface section 183 of the third protection cover member 173, and fastening the captive bolts 176 into the second weld nuts 188 welded to the eighth surface section 184 of the third protection cover member 173 (FIG. 38).

Figure 39:
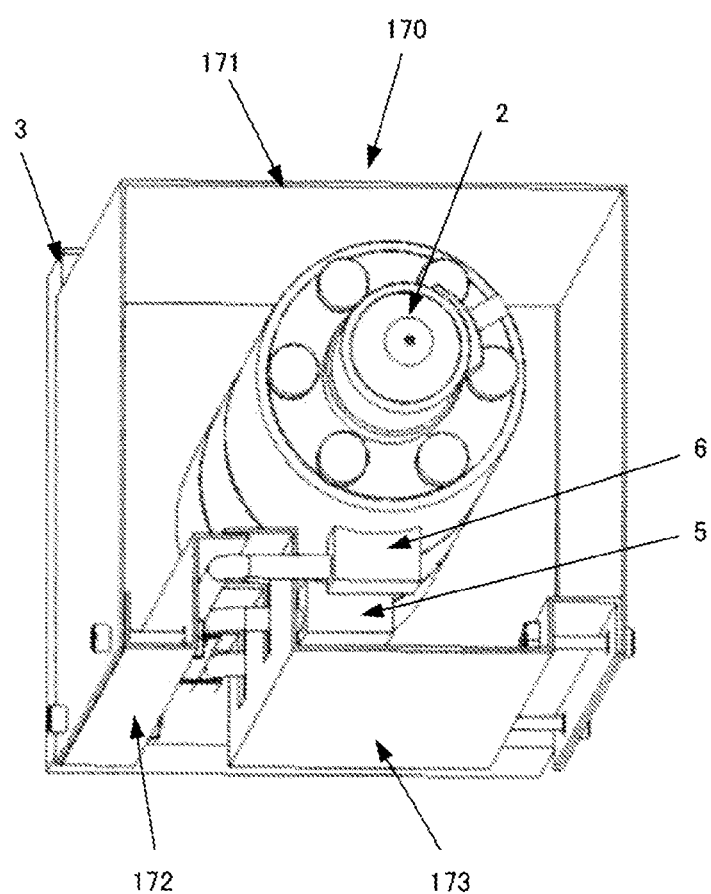
FIG. 39 is a diagram showing a state in which the second protection cover member shown in FIG. 36 and the third protection cover member shown in FIG. 38 are attached to the first protection cover member shown in FIG. 35.

As shown in FIG. 39, a part of the sixth surface section 180 of the second protection cover member 172 and a part of the tenth surface section 186 of the third protection cover member 173 overlap each other. Consequently, a cable passing section is formed, so that It is possible to draw out the power supply cables 7, 8, and 9 of the heating cylinder electric heaters 10, 11, and 12 to the outer side of the heating cylinder protection cover 170 from the cable passing section without untying the power supply cables 7, 8, and 9 of the heating cylinder electric heaters 10, 11, and 12 bundled into one cable by the tying bands 14.

In this embodiment, the third surface section 177 of the second protection cover member 172, parallel to the fourth surface section 178 of the second protection cover member 172 and located on the outer side, comes into contact with the first surface section 174 of the first protection cover member 171. Consequently, an interval between the fourth surface section 178 having the first weld nuts 181 and the first surface section 174 is retained by the fifth surface section 179. Therefore, there is a degree of freedom in movement in the axial direction of the captive bolt 176 having the long neck section. Consequently, even if the captive bolts 176 present in a plurality of places are drawn out from the first weld nuts 181 one by one, the first surface section 174 of the first protection cover member 171 are not deformed. The same applies to the seventh surface section 183, the eighth surface section 184, and the ninth surface section 185 of the third protection cover member 173 and the second surface section 175 of the first protection cover member 171.

In this embodiment, when the thickness of a material of the heating cylinder protection cover 170 is sufficiently large with respect to a screw pitch of the captive bolts, internal threads may be directly machined in the heating cylinder protection cover instead of using the first weld nuts 181 and the second weld nuts 188. The plane section 191, which is the connecting section that connects the first surface section 174 and the second surface section 175 of the first protection cover member 171, and the fifth surface section 179 of the second protection cover member 172 and the ninth surface section 185 of the third protection cover member 173 may be formed using a curved surface or a plurality of bent planes. The first and second plane sections 190, which are the connecting sections that connect the eighth surface section 184 and the tenth surface section 186 of the third protection cover member 173, may be formed using one plane or curved surface or a plurality of bent planes. Note that the fold 23 shown in FIG. 2 (the first embodiment) may be provided in the cutouts 189 for cable passing section formation (FIG. 38) formed in the third protection cover member 173.

In the heating cylinder protection cover of the injection molding machine according to the present invention, as explained above, the cutouts for cable passing section formation are provided in a part or all of the plurality of protection cover members configured from the divided plurality of protection cover members and connected to one another. However, it is unnecessary to provide the cutouts for cable passing section formation in all connecting sections of the protection cover members connected to one another. For example, it is unnecessary to provide the cutouts for cable passing section formation in the connecting sections of the first protection cover member 31 and the second protection cover member 32 in the second embodiment (FIGS. 6 and 7). The cutouts for cable passing section formation are desirably respectively arranged such that, when the heating cylinder protection cover is attached to the heating cylinder, cable passing sections are formed in the vicinities of portions where the power supply cables of the heating cylinder electric heaters are connected to the heating cylinder electric heaters. However, the cable passing sections and the power supply cables of the heating cylinder electric heaters do not have to be associated in a one-on-one relationship.

Figure 7:
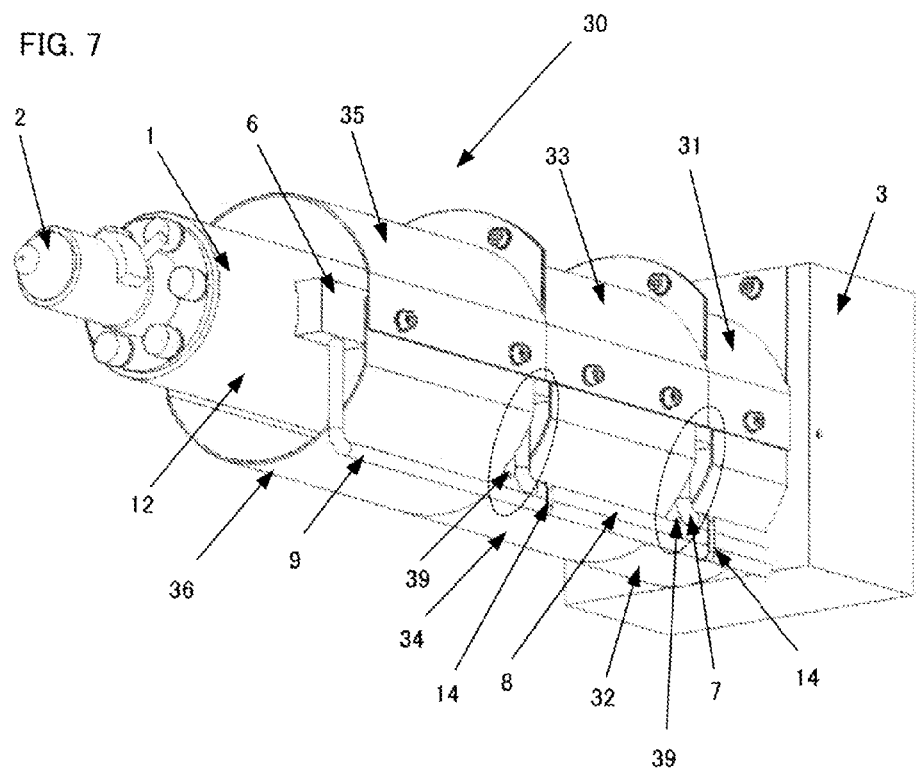
FIG. 7 is a diagram showing a state in which the heating cylinder protection cover shown in FIG. 6 is attached to the heating cylinder of the injection molding machine shown in FIG. 5.

A dividing line, which serves as a boundary between the protection cover members joined to each other among the plurality of protection cover members configuring the heating cylinder protection cover, is closed (for example, the protection cover members are divided by a plane perpendicular to the center axis of the heating cylinder) in the second embodiment (see FIGS. 5 to 7). On the other hand, in the third to ninth embodiments, the dividing line extends from the front end to the rear end of the heating cylinder protection cover in the axial direction of the heating cylinder (e.g., in a direction parallel to the center axis of the heating cylinder).

What is claimed is:

1. A heating cylinder protection cover for covering an entire circumference of a heating cylinder of an injection molding machine, wherein
    the heating cylinder protection cover comprises a plurality of dividable protection cover members joined to one another,
    cutouts for a cable are provided in at least one of first and second protection cover members among the plurality of protection cover members, the first and second protection cover members joined to each other,
    the entire circumference of the heating cylinder is covered by assembling all the protection cover members configuring the heating cylinder protection cover to the heating cylinder, and
    a cable passing section for drawing out the cable to an outer side of the heating cylinder protection cover is formed by the cutouts, the cutouts being formed in a boundary between the first protection cover member and the second protection cover member.

2. The heating cylinder protection cover according to claim 1, wherein
    a dividing line, which serves as a boundary between the protection cover members joined to each other among the plurality of protection cover members configuring the heating cylinder protection cover, extends from a front end to a rear end of the heating cylinder protection cover in an axial direction of the heating cylinder.

3. The heating cylinder protection cover of an injection molding machine according to claim 1, wherein
    a dividing line, which serves as a boundary between the protection cover members joined to each other among the plurality of protection cover members configuring the heating cylinder protection cover, is closed.

4. The heating cylinder protection cover according to claim 1, wherein
    the first and second protection cover members among the plurality of protection cover members configuring the heating cylinder protection cover are joined to each other by a captive bolt.

5. The heating cylinder protection cover according to claim 4, wherein
    the first protection cover member includes a first surface section having a first hole,
    the second protection cover member includes
        a second surface section parallel to the first surface section of the first protection cover member and having a second hole formed in a position corresponding to the first hole of the first surface section, and
        a third surface section parallel to the second surface section and including a bolt fixing section provided coaxially with the second hole of the second surface section, and
    the first protection cover and the second protection cover are joined to each other by the captive bolt inserted through the first hole and the second hole and fastened into the bolt fixing section.

6. A heating cylinder protection cover for covering an entire circumference of a heating cylinder of an injection molding machine, the heating cylinder protection cover comprising a cable passing section for drawing out a cable to an outer side of the heating cylinder protection cover, wherein a fold is provided in the cable passing section.

\* \* \* \* \*